(12) United States Patent
Guyton

(10) Patent No.: US 11,549,253 B2
(45) Date of Patent: Jan. 10, 2023

(54) VARIOUS ECOLOGICAL COMPRESSION FLUSHABLE PORTABLE COMMODESPOTABLE COMMODES

(71) Applicant: Dean Guyton, Houston, TX (US)

(72) Inventor: Dean Guyton, Houston, TX (US)

(73) Assignee: Dean Guyton, Houston, TX (US)

( * ) Notice: Subject to any disclaimer, the term of this patent is extended or adjusted under 35 U.S.C. 154(b) by 0 days.

(21) Appl. No.: 17/420,473

(22) PCT Filed: Jan. 3, 2020

(86) PCT No.: PCT/US2020/000001
§ 371 (c)(1),
(2) Date: Jan. 20, 2022

(87) PCT Pub. No.: WO2020/142574
PCT Pub. Date: Jul. 9, 2020

(65) Prior Publication Data
US 2022/0186481 A1    Jun. 16, 2022

Related U.S. Application Data

(60) Provisional application No. 62/917,843, filed on Jan. 3, 2019.

(51) Int. Cl.
*E03D 11/02* (2006.01)
*A47K 11/06* (2006.01)
(Continued)

(52) U.S. Cl.
CPC ............ *E03D 11/025* (2013.01); *A47K 11/06* (2013.01); *A61G 9/003* (2013.01); *E03D 11/11* (2013.01); *E03D 11/18* (2013.01)

(58) Field of Classification Search
CPC .... A01K 1/0121; A47K 13/005; A47K 13/06; A61G 9/00–006
See application file for complete search history.

(56) References Cited

U.S. PATENT DOCUMENTS 1,597,129 A    8/1926    Watters
1,711,295 A    4/1929    Wernle
(Continued)

FOREIGN PATENT DOCUMENTS

WO    1994023631 A1    10/1994
WO    WO9423631    * 10/1994 ............. A47K 11/04
WO    2012009020 A9    1/2012

OTHER PUBLICATIONS

ISRWO of related PCT/US2020/000001 dated Jun. 22, 2020.

*Primary Examiner* — David P Angwin
*Assistant Examiner* — Nicholas A Ros
(74) *Attorney, Agent, or Firm* — Vorys, Sater, Seymour and Pease LLP

(57) ABSTRACT

Multiple apparatuses for flushing portable commodes into a conventional toilet bowl, including a push button fully automated unit that operates by a rechargeable battery. The portable commode is comprised of a waste receiving container and associated housing structure which is adapted to be seated on top of a conventional toilet. The waste container is rotated around 150 degrees and water from the interior of the toilet bowl is forcefully discharge when flushing the portable commode's waste container with electro-mechanical power to guarantee excellent cleaning. Sanitation is adapted to ensure hygienic security.

17 Claims, 28 Drawing Sheets

(51) Int. Cl.
  *A61G 9/00* (2006.01)
  *E03D 11/11* (2006.01)
  *E03D 11/18* (2006.01)

(56) References Cited

U.S. PATENT DOCUMENTS

| | | | | |
|---|---|---|---|---|
| 2,348,102 A | * | 5/1944 | Baker | D06F 41/00 |
| | | | | 68/4 |
| 2,834,026 A | | 5/1958 | Kronish | |
| 3,083,375 A | | 4/1963 | Jewell | |
| 3,166,767 A | | 1/1965 | Jewell et al. | |
| 3,570,271 A | * | 3/1971 | Brown | D06F 13/00 |
| | | | | 68/3 R |
| 3,645,283 A | | 2/1972 | Cassells | |
| 3,842,803 A | * | 10/1974 | Temel | A01K 1/011 |
| | | | | 119/163 |
| 3,855,640 A | | 12/1974 | Filliung et al. | |
| 4,011,836 A | * | 3/1977 | Temel | A01K 1/011 |
| | | | | 119/163 |
| 4,759,085 A | | 7/1988 | Ottosson | |
| 4,797,959 A | | 1/1989 | Decaux | |
| 5,027,451 A | * | 7/1991 | Wooten | A01K 1/0121 |
| | | | | 4/313 |
| 5,117,780 A | * | 6/1992 | Wooten | A01K 15/02 |
| | | | | 119/162 |
| 5,638,555 A | * | 6/1997 | Guyton | E03D 7/00 |
| | | | | 4/340 |
| 6,286,154 B1 | | 9/2001 | Pitts et al. | |
| 7,020,909 B2 | | 4/2006 | Ciotic | |
| 9,468,956 B2 | * | 10/2016 | Simundic | B08B 9/08 |
| 9,714,507 B1 | | 7/2017 | Snell | |
| 2006/0191065 A1 | | 8/2006 | Martinez et al. | |

\* cited by examiner

VARIOUS ECOLOGICAL COMPRESSION FLUSHABLE PORTABLE COMMODESPOTABLE COMMODES

TECHNICAL FIELD

The present invention relates to portable commodes and more specifically to portable commodes that are commonly dumped into a permanently fixed residential, commercial or institutional toilet bowl.

BACKGROUND

Toddlers are trained to use regular toilet bowls with Child potties (toilets), and individuals who have ambulatory medical problems used bedside commodes and bedpans when in commercial medical facilities and residential medical care. All of these products usually come equipped with a structure that supports a sitting (or standing) human being while they deposit human waste into a waste container (which is usually centered within a housing structure). They all have in common the need to be cleaned usually by first having the waste container dumped into a fixed toilet bowl. Then the residual waste in the waste container must be cleaned by a clean water source and again dumped into the fixed toilet bowl.

There are at least three prior arts (one actually in the market and two purported) that can be adapted to clean these products. The first is the manually cleaned units which has a removable waste container within a structural support designed for human beings to sit on to deposit their waste in as bathroom service is needed. For example, U.S. Pat. No. 5,083,325 discloses a portable commode in the form of a simulation of an automobile. After waste is deposited in it, the waste container is removed from the structural support, carried and dumped into the residential or institutional fixed toilet. Then this waste container is carried over to fresh water source (usually the sink or bathtub bathroom facet) to have fresh water deposited into it. Now with clean water in it, the waste container is carried back to the toilet bowl, agitated to assist in cleaning, and then dumped again into the toilet bowl. The waste container may have to be transported back and forth to the toilet bowl and fresh water source to be rinse, agitated and dump into the fixed toilet bowl several times until the waste container is cleaned. Once the waste container is cleaned, fresh water is commonly deposited into it by the caregiver. This is because clean water in the container before waste enters into it limits the ability of incoming waste to stick to the container, making it easier for the caregiver to clean it. Then the waste container is positioned back into the support structure and ready to be re-used.

a) This process is extremely laborious since (depending on the composition of the body waste) many time the cleaning process requires the caregiver to walk back and forth from the clean water facet to the toilet bowl with an open waste container of human waste.

b) In addition, depositing water into a soiled open waste container at a sink and carrying and dumping it into the toilet bowl presents the hazardous potential of spillage of the waste material.

c) The patients and caretaker are both embarrassed by the senses of sight and smell occasioned by this manual cleaning process.

The second prior art is a purported portable self cleaning bodily waste receptacle that consists of a fluid tight reservoir container forming an enclosed open space. Inset within the container is a toilet bowl element. The container has a fill opening and a fill cap. Water or waste cleaning fluid or a combination of both is poured into the container through the fill cap, so that it fills the container reservoir around the underside and sides of the toilet bowl element. An enclosed, battery operated waterproof pump is positioned within the container and a directing hose extends from the pump, through the container space and outside the container to the toilet bowl element. When the toilet bowl element needs cleaning, the pump is actuated by a manual switch which pumps the waste cleaning fluid under pressure through and out the hose, where it is sprayed in the toilet bowl element for cleaning the toilet bowl element. A discharge valve is provided at the bottom surface of the toilet bowl element for discharging the bodily waste and the cleaning fluid. It has a second embodiment; bladders are located in the reservoir container for providing water or waste cleaning fluid under pressure to the toilet bowl element. In another embodiment, this pressurized bladder system is in a bedpan receptacle.

a) This product apparently has not experience market success. There is no mention of where the waste is to be cleaned from the toilet element.

b) It also has the expense of batteries and an electric waterproof motor.

The third is a purported apparatus for disposing of body waste in a portable toilet into a fixed residential or institutional conventional toilet bowl (see U.S. Pat. Nos. 5,907,874, 5,638,555 and 5,615,420 and has never experienced market success. It comprises a container and an associated hollow housing structure which are adapted to be seated on a conventional toilet bowl. Waste in the container is dumped into the toilet via a cable mechanism on the intake stroke of a hand pump. A water intake hose is manually lowered into the toilet water via a hose control handle prior to the operation of the pump. While the container is in a vertical dumping position, the exhaust stroke of the pump forces water siphoned from the toilet through a jet outlet to clean the interior of the container. The waste and toilet water in the container is discharged directly into the bowl without impinging the hollow housing structure. The container automatically returns to its rest, or horizontal position due to an action of a return spring.

a) I have discovered that the exhaust stroke of the pump is dependent on human arm strength and even at best there is not enough velocity and force on the water to clean the waste container.

b) In addition, a conscience and concerted effort by the caregiver cannot be depended on to create the required water force and velocity to clean the vertical position bowl by water flowing out of the nozzle.

c) The way the art is designed it cannot provide the physics required to create the force required to clean the waste container even if it is a small container for the child potty. This is because it is unnatural for someone to have to consistently be conscience that they have to force the handle down very hard or it will not have the slightest chance of cleaning the waste container.

d) Also, when the bowl is inverted by the hose handle return spring, a counter balance problem exist that is impossible to overcome by this art's design when it has to overcome the bias on the bowl return spring while, again, attempting to dump it simultaneously.

e) In addition, the hose intake is not sufficient to receive enough water out of the toilet bowl with the small amount of water in the water efficient toilet bowl.

f) The priming of the unit also creates so much dead space that not enough water is available even if there was enough force to clean the unit on the exhaust stroke.

g) The residual water from the intake valve and hose, after coming out of the toilet water, leaks on the floor which causes and unsanitary situation.

Manual Portable Commode Process a) This process is extremely laborious since (depending on the composition of the body waste) many time the cleaning process requires the caregiver to walk back and forth from the clean water facet to the toilet bowl with an open waste container of human waste.

b) In addition, depositing water into a soiled open waste container at a sink and carrying and dumping it into the toilet bowl presents the hazardous potential of spillage the waste material.

c) The patients and caretaker are both embarrassed by the senses of sight and smell occasioned by this manual cleaning process.

Electric Self Cleaning Bodily Waste Receptacle a) This product apparently has not experience market success.

b) This product requires a reservoir to be manually filled with water which makes the product more weighty and laborious by requiring almost the same amount of steps as the old manually cleaning process.

SUMMARY OF THE EMBODIMENTS

Flushable Portable Commode a) I have discovered that a major problem that exist in that the exhaust stroke of the pump is dependent on human arm strength and a self-conscience effort of pushing the pump handle down very hard to have any chance of creating enough velocity and force on the water to clean the waste container.

b) In addition, a conscience and concerted effort by the caregiver cannot be depended on to create the required water force and velocity to clean the vertical position bowl by water flowing out of the nozzle.

c) The way the art is designed it cannot provide the physics required to create the force required to clean the waste container even if it is a small container for the child potty. This is because it is unnatural for someone to have to consistently be conscience that they have to force the handle down very hard or it will not have the slightest chance of cleaning the waste container.

d) Also, when the bowl is inverted by the hose handle return spring, a counter balance problem exist that is impossible to overcome by this art's design when it has to overcome the bias on the bowl return spring while, again, attempting to dump it simultaneously.

e) In addition, the hose intake is not sufficient to receive enough water out of many of the toilet bowl today especially with the small amount of water in the so called ecologically efficient toilet bowl.

f) The priming of the unit also creates so much dead space that not enough water is available even if there was enough force to clean the unit on the exhaust stroke.

g) The residual water from the intake valve and hose, after coming out of the toilet water, leaks on the floor which causes and unsanitary situation, h) that eliminates the addition contributing factor of malfunction related to the exhaust nozzle and hose being connected to the bowl creating insurmountable weight that requires such a powerful spring on the hose control arm that many of the would be users wouldn't be able to operate the unit, i) that provide a unit whom structural requirement would not make it prohibitive weight wise.

According to several advantages of one or more aspects are as follows: to provide a flush-able portable commodes that eliminates the unsanitary condition of exposing waste containers to clean water facets that currently exist with manually cleaned portable (which is all on the market today), that eliminates the need for caregivers to transport waste container back and forth from the fresh water facet to the toilet bowl, that mostly eliminates the offense to the human senses of having to see and smell human waste associated with the cleaning of the open waste container's manually cleaning process, and that provides a cleaning process that enhances the dignity caregiver and care receiver of the very depressing and humiliating process that almost entirely used in the manual cleaning process, that eliminates the need to depend on the operator having an unnatural and self-conscience effort to exert on a pump handle a sufficient force if they would actually expect the unit to work, that eliminates the counterbalance problem that exist when the waste container return spring has to be overcome by the bowl dumping spring, that eliminates the addition contributing factor of malfunction related to the exhaust nozzle and hose being connected to the bowl creating insurmountable weight that requires such a powerful spring on the hose control arm that many of the would be users wouldn't be able to operate the unit, that provide a unit whom structural requirement would not make it prohibitive weight wise.

In some embodiments, the present disclosure provides a method for flushing a flush-able portable commode waste container into a ecological and regular toilet bowl, that eliminates the human element during the said container flushing process, with a consistent forceful discharge of water after placed over top of a toilet bowl by using a human hand and foot to clean a body waste container of a flush-able portable commode whose housing sits on a toilet bowl with a water supply and water in a drain outlet hole and siphons the liquid from the said toilet bowl and flushes the said body waste container with the said liquid flushing material, comprising the steps of:

a. picking up for transporting the said housing of the flush-able portable commode and either before or afterwards triggering the lowering of an intake tube connected to a compression chamber associated with said housing of the said flush-able portable commode, and b. directing the said intake tube into the said drain outlet water hole of the said toilet bowl, and c. actuating the said compression chamber with a human hand and foot causing water to siphon from the toilet bowl water into the chamber, and d. when chamber has completed receiving clean water from the toilet, the human hand and foot releases the chamber's intake activity and the intake tube retracts from the toilet bowl water into the said housing, and e. the resilient material vacates forcefully the said in-taken water from the compression chamber flushing clean the waste container into the toilet bowl.

The present disclosure further provides a method for flushing a flush-able portable commode that sits over a toilet bowl to siphons water from the said toilet bowl to flush the said flush-able portable commode into the said toilet bowl forcefully discharging the liquid cleaning material a. lowering an intake tube from the portable commode housing so that the intake tube can be steered into the toilet bowl outlet hole as the portable commode is being place on top of the said toilet bowl, and b. transmitting a compression chamber to a resilient device that can be pulled but returned to its former shape or position when released, and c. moving a pump handle with leverage transmission means connected to the said intake hose to an extended position.

The present disclosure further provides a method for flushing a self cleaning portable commode that forcefully exhausted the cleaning water without human hand and foot, comprising:

a. providing an elongated leverage lever actuator whereby said lever is extended away from a transmission means on one end but connected to transmission means on the other end, and providing an elongated leverage lever actuator connected to a transmission means on one end and forming an operator on the opposite end, and b. said transmission connected to a compression chamber which has a negative pressure applied when a hand and foot of a human being actuates the operator end of said lever in one direction which simultaneously actuates a spring means to the said chamber, and c. that creates negative pressure within a compression chamber when said lever is moved in one direction simultaneously extending a spring means.

DETAILED DESCRIPTION

Description of a First Embodiment

Figure 1:
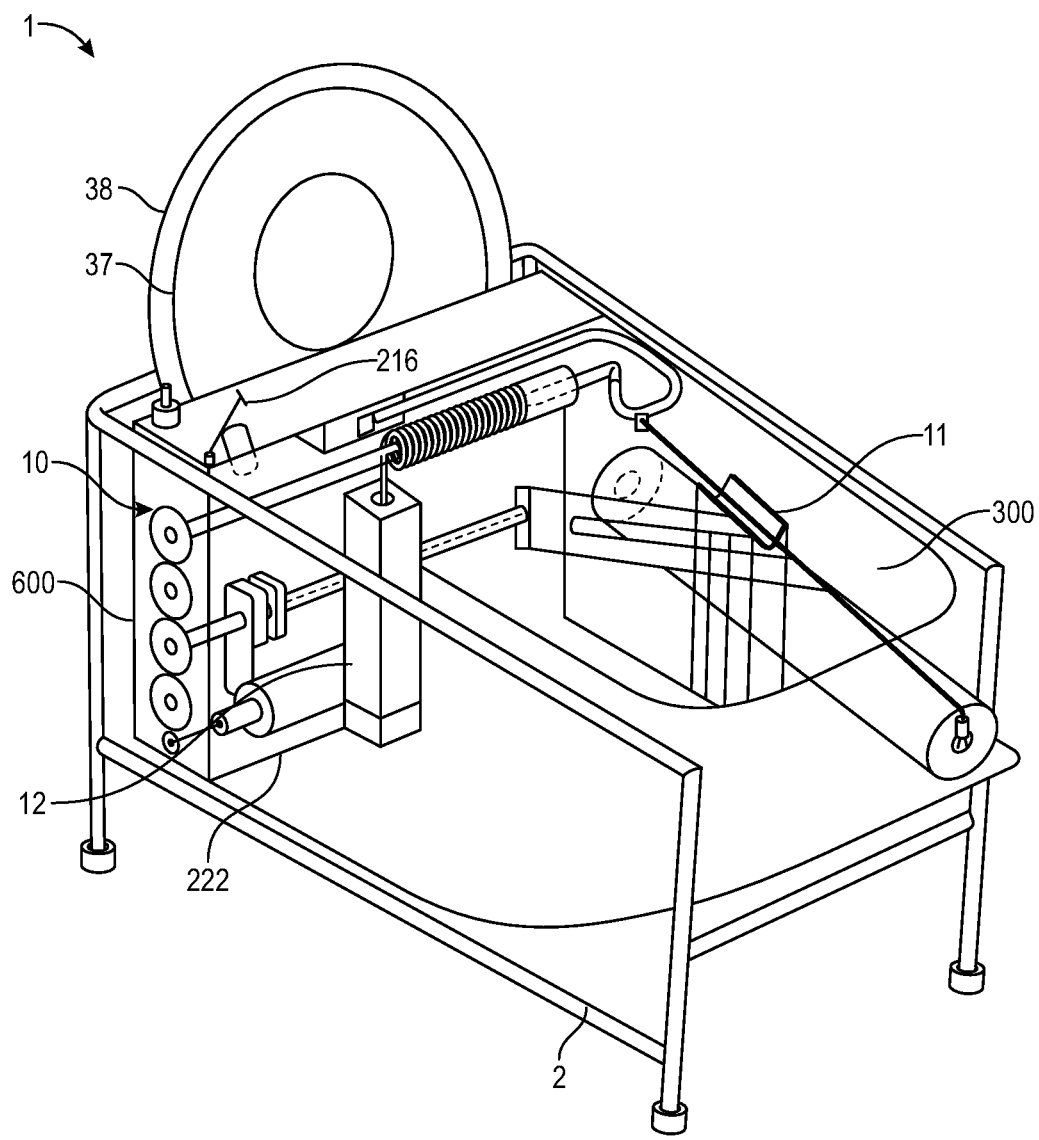
FIG. 1 is a perspective front view of an embodiment of an electric powered flushable portable commode in accordance with principles described herein; wherein, various portions of the portable commode are withheld or presented as broken-away in order to show some interior parts.

With reference to FIG. 1, a push button operable, electric powered flushable portable commode 1 is shown. Portable commode 1, which may also be called a toilet, may be battery powered and is illustrated sitting within a supporting frame or chair 2. While waiting for use, chair 2 and portable commode 1 may be positioned near a bed or at another location convenient to a person who may need to use the commode 1. Alternatively, portable commode 1 may be positioned for use without chair 2.

Portable commode 1 or, simply, commode 1 includes a waste container 300, a toilet seat 37, a toilet seat cover 38, and a flushing and dumping assembly 10, which includes a fluid intake system 66, a discharge fluid path 70, and a dumping system 11. These components are contained within or coupled to a support structure or base housing 600. Housing 600 has an opening in at its bottom, and the waste container 300 is rotatably mounted to base housing 600 by flushing and dumping system 11 to facilitate cleaning. During a typical operation, after receiving waste, commode 1 may be, for example, transported and placed over a conventional residential, institutional, or commercial toilet bowl, which may be fixedly mounted. After commode 1 is disposed over the toilet bowl, flushing and dumping assembly 10 may be activated to drawn-in and retain water for rinsing (also called flushing herein), which may be extracted from the toilet bowl. The waste container 300 may be rotated by assembly 10 to dump its contents into the toilet bowl. Subsequently, flushing and dumping assembly 10 may flush waste container 300 using the retained water, which drains from waste container 300 into the toilet bowl. During this process waste container 300 remains coupled to housing 600. As will be described, portable commode 1 can be push-button operable for dumping and flushing waste from container 300.

Figure 2:
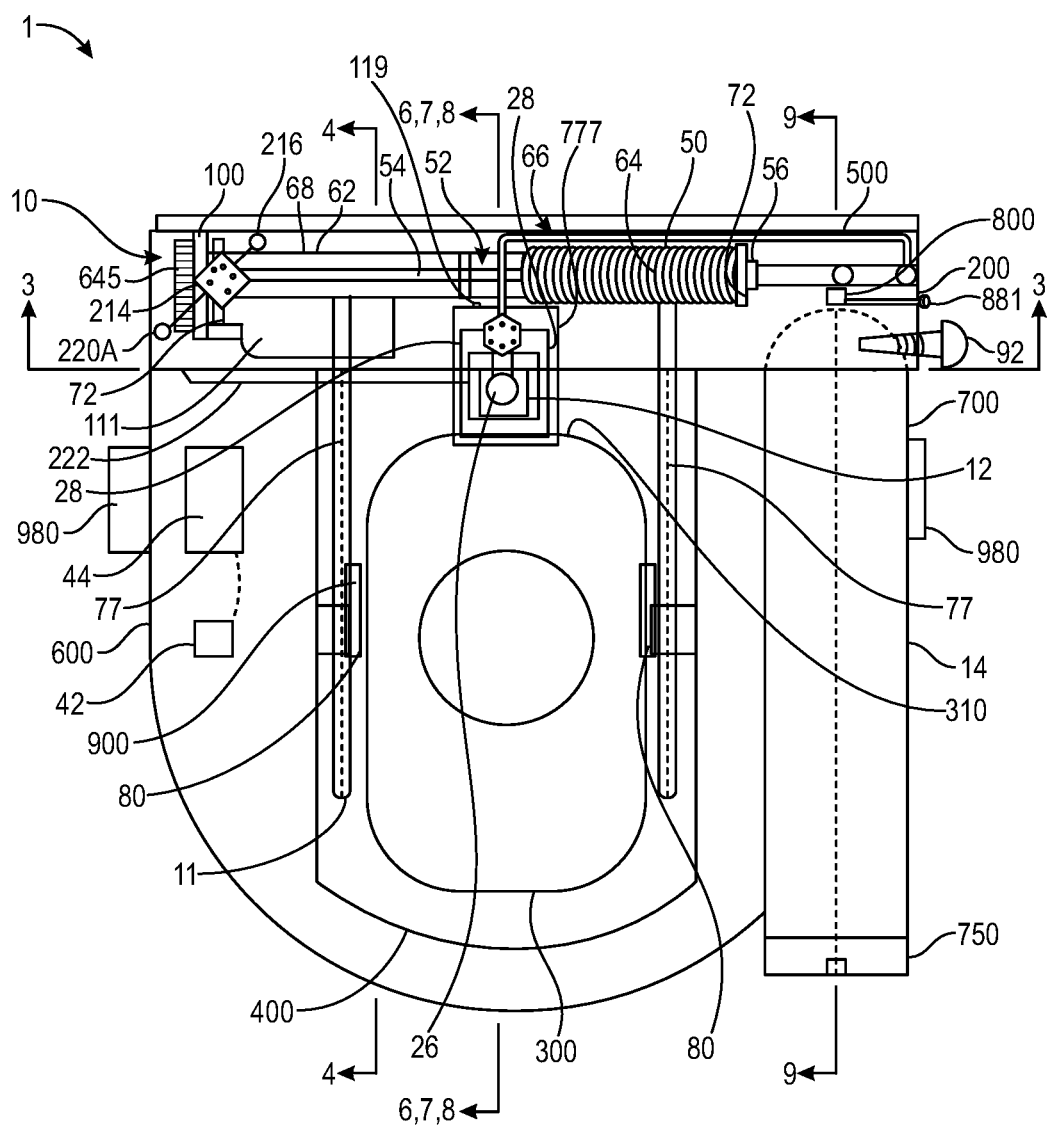
FIG. 2 is a top view of the portable commode of FIG. 1 shown without a seat and seat cover. Various section lines, 3-3, 4-4, (6,7,8)-(6,7,8) and 9-9, are shown to introduce sectional views for figures having corresponding figure numbers.

FIG. 2 is a top view of portable commode 1 showing waste container 300 mounted to dumping system 11 within base housing 600, being supported and surrounded by a waste containment area bulkhead 400, which is a support structure for waste container 300. A pair of carrying handles 980 is attached, with a handle 980 disposed on the left side and a handle 980 disposed on right side of base housing 600.

Flushing and dumping assembly 10 includes a gear train 625 coupled to a reversible electric motor 111 and an intake tube reel axle 54. The flushing and dumping assembly 10 includes an intake tube reel 50 coupled for rotation with axle 54, and a pump 14, which in this embodiment is cable-driven piston-cylinder assembly coupled to gear train 625 by another axle, as will be described below. Axle 54 defines an axis about which the intake tube reel 50 may rotate. Various components of flushing and dumping assembly 10, such as motor 111, gear train 625, the plurality of gear-driven axles, and pump 14, are mounted within or extend from a mechanical zone or mechanical box 500 located at the rear of base housing 600, behind waste container 300. In some embodiments, mechanical box 500 is configured as a support structure, such as a plate or wall, from which components of flushing and dumping assembly 10 are mounted. The cable-driven piston-cylinder pump 14 extends from mechanical box 500 alongside the right side of waste container 300. Pump 14 may also extend outside housing 600. Other arrangements are contemplated.

Commode 1 further includes an electronic system 44 powered by a battery 42. When activated, electronic system 44 governs the initiation, execution, and completion of the water intake, dumping, and rinsing processes of commode 1, which will be described below. The operations within electronic system 44 are based on the procedures disclose herein. In some embodiments, motor 111 includes a transmission.

Figure 3:
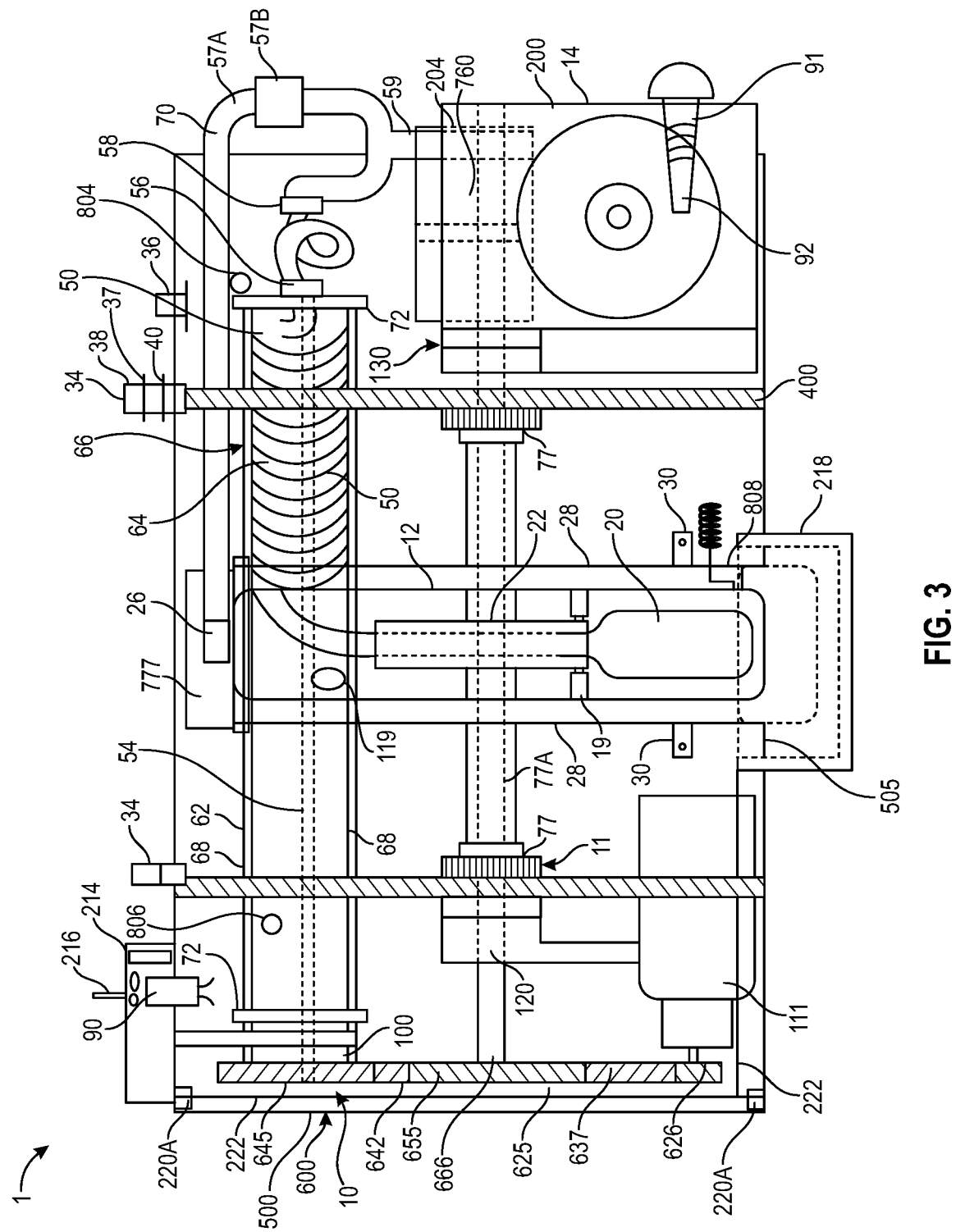
FIG. 3 is a front sectional view of the portable commode taken on the line 3-3 of FIG. 2 and showing working components that are disposed at the rear of the commode.

As seen in FIG. 3, gear train 625, which couples to the electric motor 111 for rotation, includes a plurality of gears, which in the present embodiment includes five gears 626, 637, 655, 642, 645 vertically disposed and inter-connected for rotation. All five gears turn whenever the motor 111 is turning and the third and fifth gears have axles 666, 54 connected to them, respectively. The entire unit, e.g., the flushing and dumping assembly 10, operates using these axles, driven by motor 111. There are three electromagnetic clutches that are connected to these axles, and these three clutches actuate the various operations of the flushing and dumping assembly 10. Thus, the rotation of the intake tube reel 50 is motor-driven, the operation of the pump 14 is motor-driven, and the movement of the waste container 300 between a rest position and a dump position is motor-driven.

Within commode 1, the five gears are disposed on the left side of mechanical box 500. The first gear of gear train 625 is a pinion gear 626 connected to motor 111, the second is idler gear 637, the third is the dumping arm and pump gear 655, and gear 655 is connected to a dumping arm and pump axle 666. The fourth is another idler gear 642. The fifth gear is the intake tube reel gear 645, which is coupled to the intake tube reel axle 54. As shown in FIG. 3 and FIG. 2, the intake tube reel gear 645 is connected to the intake tube reel T axle 54 is connected to the other side of clutch 100. The axle 54 extends horizontally from the said clutch 100 into the intake tube screw shaped reel 50. Engagement or activation of clutch 100 couples gear 645 to axle 54 and thus to reel 50 to cause reel 50 to rotate when gear 645 rotates. When clutch 100 is deactivated, gear 645 may rotate freely without inducing rotation in axle 54 and reel 50.

Referring to FIGS. 2 and 3, the fluid intake system 66 includes the intake tube reel 50, an intake tube 64 wound around reel 50, and an intake valve 20 coupled to the intake tube 64. Thus, reel 50 is a tubing support member for intake tube 64. The intake tube screw shaped reel 50 is disposed and extends horizontally along axle 54 and includes a screw shape pattern on its outer surface 52, configuring the outer surface to receive and wind or, alternatively, to unwind and extend the intake tube 64 when reel 50 is selectively rotated in one of two directions. As shown in the referenced figures, intake tube 64 is fitted around the screw shaped surface 52 of reel 50. Intake tube reel 50 includes an internal, axially-extending channel 50a that corresponds to and receives intake tube reel axle 54, configuring reel 50 to rotate or to stop rotating (e.g., to maintain position) when axle 54 rotates or stops rotating (e.g., maintains position), respectively. In the present embodiment, channel 50a is T-shaped, and axle 54 has a T-shaped cross-section configured to engage with the slot in reel 50. In at least some embodiments, axle 54 fits loosely within channel 50a and has sufficient length to enable reel 50 to move horizontally along axle 54 towards or away from clutch 100 when reel 50 and axle 54 rotate to wind or unwind intake tube 64.

As seen in FIG. 3, the intake tube 64 goes through a tubular shaped vertical intake valve weight brace 22 and connects to the intake valve 20, which couples to intake tube 64. In the present embodiment, valve 20 is a check valve that hangs from the leading end of intake tube 64 and both are disposed inside an intake elevator 12. Several of these features are also shown in FIGS. 1 and 2.

Figure 4:
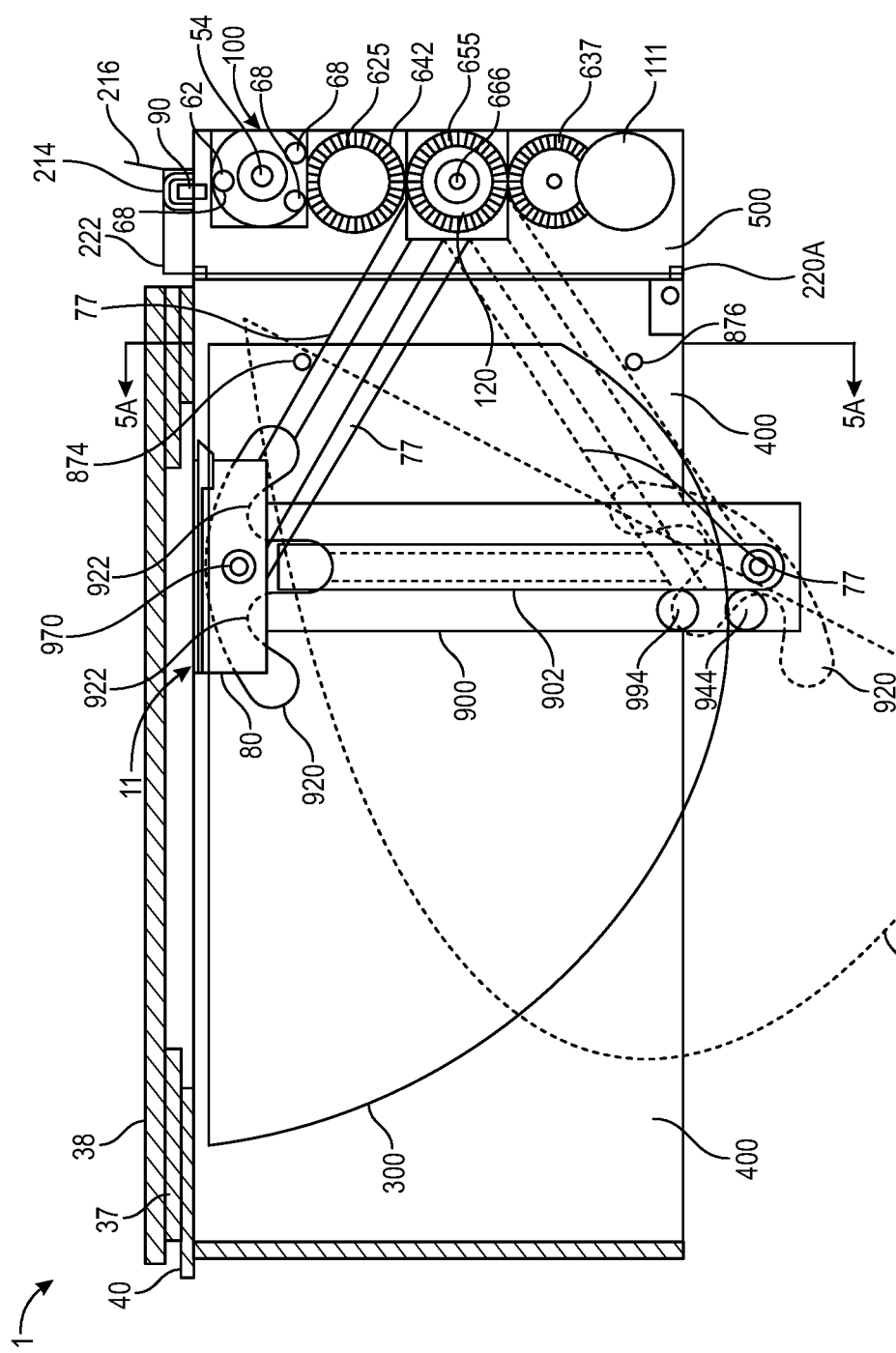
FIG. 4 is a leftward-facing sectional view of the portable commode taken along the line 4-4 of FIG. 2, showing stages of operation of the waste container and the dumping system in which the waste container is in an upright position (solid lines) and, alternately, is in an inverted position (dashed lines) for dumping and cleaning.

Shown in FIGS. 3 and 4, a reel stabilizer 62 is disposed around reel 50 and the portion of intake tube 64 that is wrapped on reel 50. Stabilizer 62 includes a plurality of elongate rollers 68 held between a pair of roller mounts 72. Reel stabilizer 62 is configured to help maintain intake tube 64 wrapped on reel 50. The present embodiment includes three rollers 68 circumferentially spaced around reel 50 and extending parallel to reel 50.

Referring now to FIGS. 2 and 3, a reel finger 119, which may be made of a smooth rounded material, is coupled and stabilized to the mechanical box 500 on one end, and the opposite end of finger 119 contacts or rides within one of the screw reel threads on reel 50. Reel finger 119 assists the reel 50 to move towards the gear 645 as reel 50 rotates and intake tube 64 unwinds into the toilet bowl. Shown in FIG. 6, flushing and dumping assembly 10 further includes a reel-to-elevator guide 55 disposed above intake tube 64 where it bends from a generally horizontal direction due to contact with reel 50 to a downward direction to reach into or be extracted from a toilet. Guide 55 is configured to aid the intake tube 64 be guided properly downward, e.g., into elevator 12. A guide roller 55' is also shown under the intake tube 64 between the reel 50 and elevator 12 also to aid with the bending movement of intake tube 64 when it is wrapped on or unwrapped from reel 50.

Figure 6:
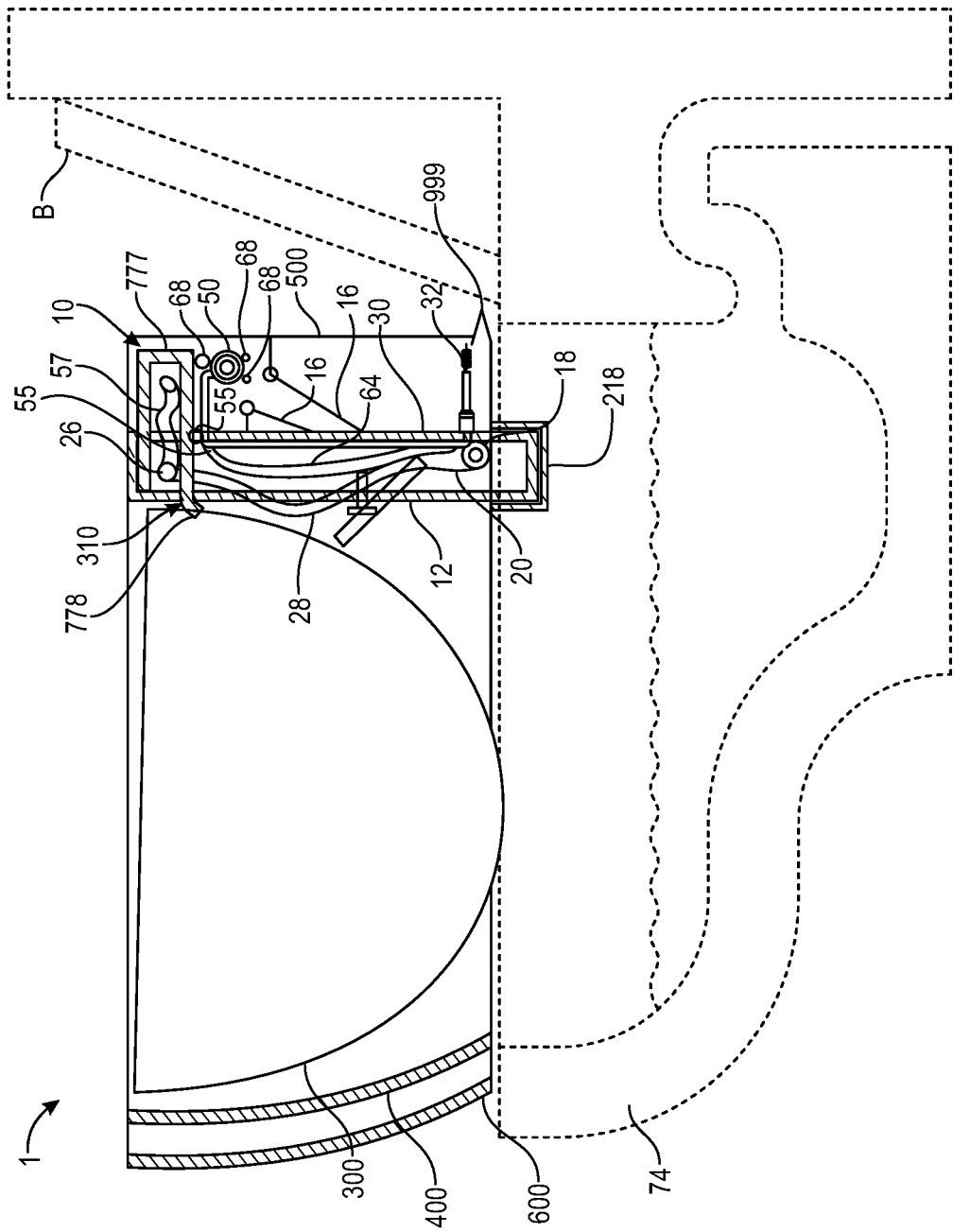
FIG. 6 is a sectional view of the portable commode taken along the line 6,7,8-6,7,8 of FIG. 2, showing the portable commode siting overtop a conventional toilet bowl, which is shown in broken lines.
Figure 7:
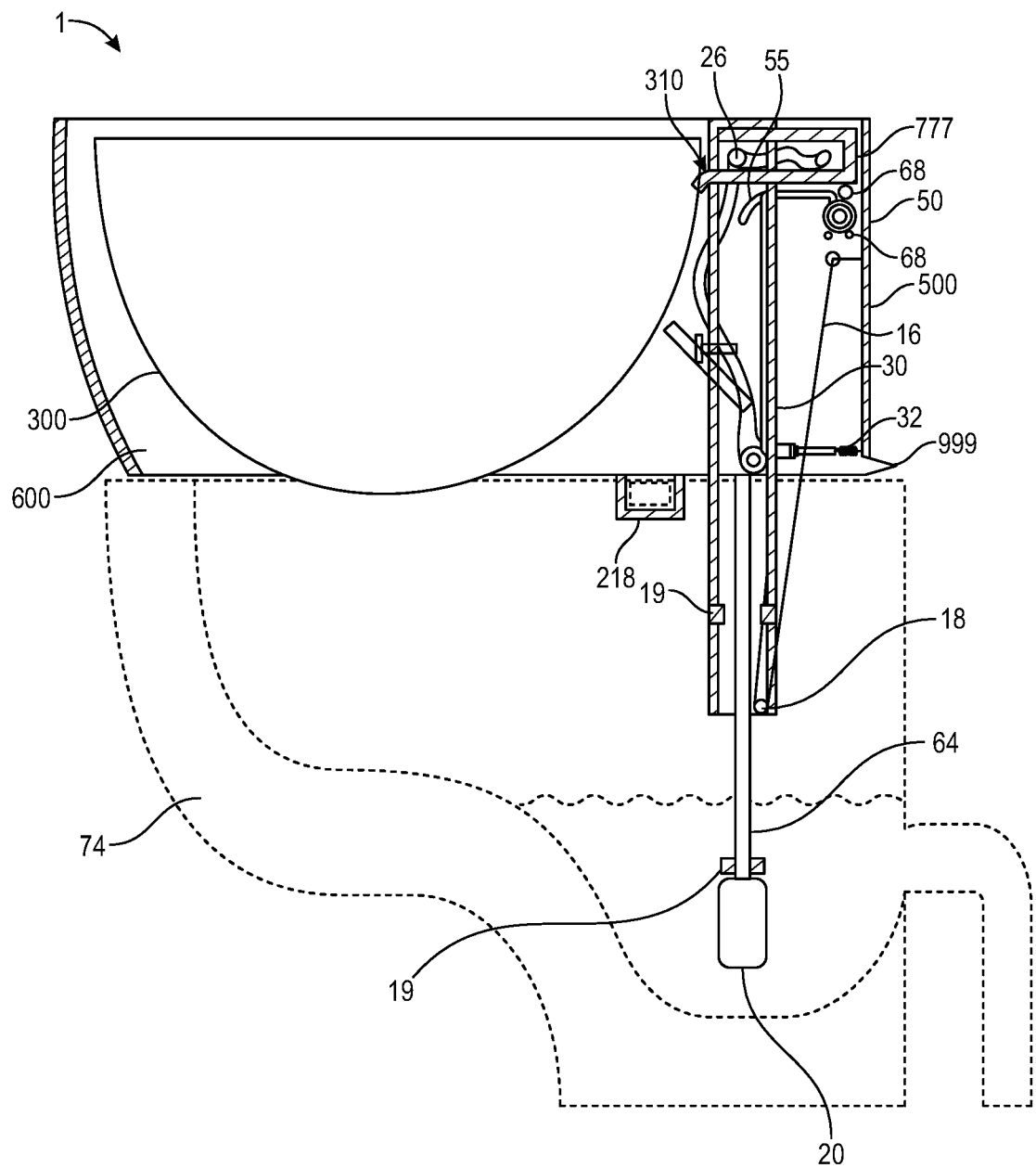
FIG. 7 is another sectional view the portable commode taken along the line 6,7,8-6,7,8 of FIG. 2, showing the intake tube lowered into a conventional toilet bowl to extract water.

Continuing to reference FIG. 6, portable commode 1 is illustrated, as an example, siting overtop a conventional toilet bowl 74, supported by the seat of the conventional toilet, which may be located in a residential, institutional, or commercial setting, as examples. As can be seen in FIG. 6, the elevator 12 includes an extendable, retractable resilient member, which in this example is represented by a bungee cord, which will be identified as an elevator bungee 16. One end of bungee 16 is attached to the mechanical box 500 and may be attached at a relatively high position within box 50. From this fixed end, bungee 16 extends down and loops around an elevator bungee roller 18 adjacent the bottom of elevator 14. From roller 18, bungee 16 extends upward and is attached to the top of the elevator 12. In FIG. 6, elevator 12 is shown in a retracted position, and bungee 16 is extended, stretched. Bungee 16 biases elevator 12 away from the retracted position, enabling elevator to move down as the intake tube 64 and valve 20 are lowered by reel 50. FIG. 7 illustrates the downward extension or position of the leading end of tube 64 and of valve 20. The resulting, lower position of elevator 12 may assist the intake tube 64 to stay straight as it travels into the bottom of a toilet bowl 74 to provide a fluid, e.g. cleaning water, to portable commode 1. Referring again to FIG. 3, an elevator catch 19 disposed within elevator 12 enables the intake tube 64 or the valve 20 to pull the elevator 12 up, against bungee 16 when intake tube 64 is retracted by rotation of reel 50.

As seen in FIGS. 2 and 3, the fluid intake system 66 further includes a rotatable fluid coupling, which may be called a swivel connector or, simply, swivel 56, and includes a union box intake tube 58 coupled to swivel 56 for fluid transfer. Swivel 56 is coupled a partition or end plate disposed at the end of the intake reel 50 disposed opposite of clutch 100. The upper or discharge end of intake tube 64 attaches to an inside end of the swivel 56 for fluid transfer. The outside end of the swivel 56 connects to the union box intake tube 58, which connects the fluid intake system 66 to an intake and exhaust coupling 59, which connects to a union box 200 on pump 14. Union box 200 functions as a sealed end cap coupled for fluid communication with an intake fluid path and a discharge fluid path. The fluid intake system 66 may be described as including the coupling 59 and pump 14. In this arrangement, an intake fluid path for extracting cleaning water from a toilet bowl extends from the lower end of intake tube 64, through swivel connector 56, intake tube 58, and coupling 59 into the union box 200 and, thereby, into pump 14. The intake fluid path also includes valve 20 to prevent water in pump 14 from discharging liquid through intake tube 64. Thus, the intake fluid path extends through intake system 66 and into pump 14.

Figure 9:
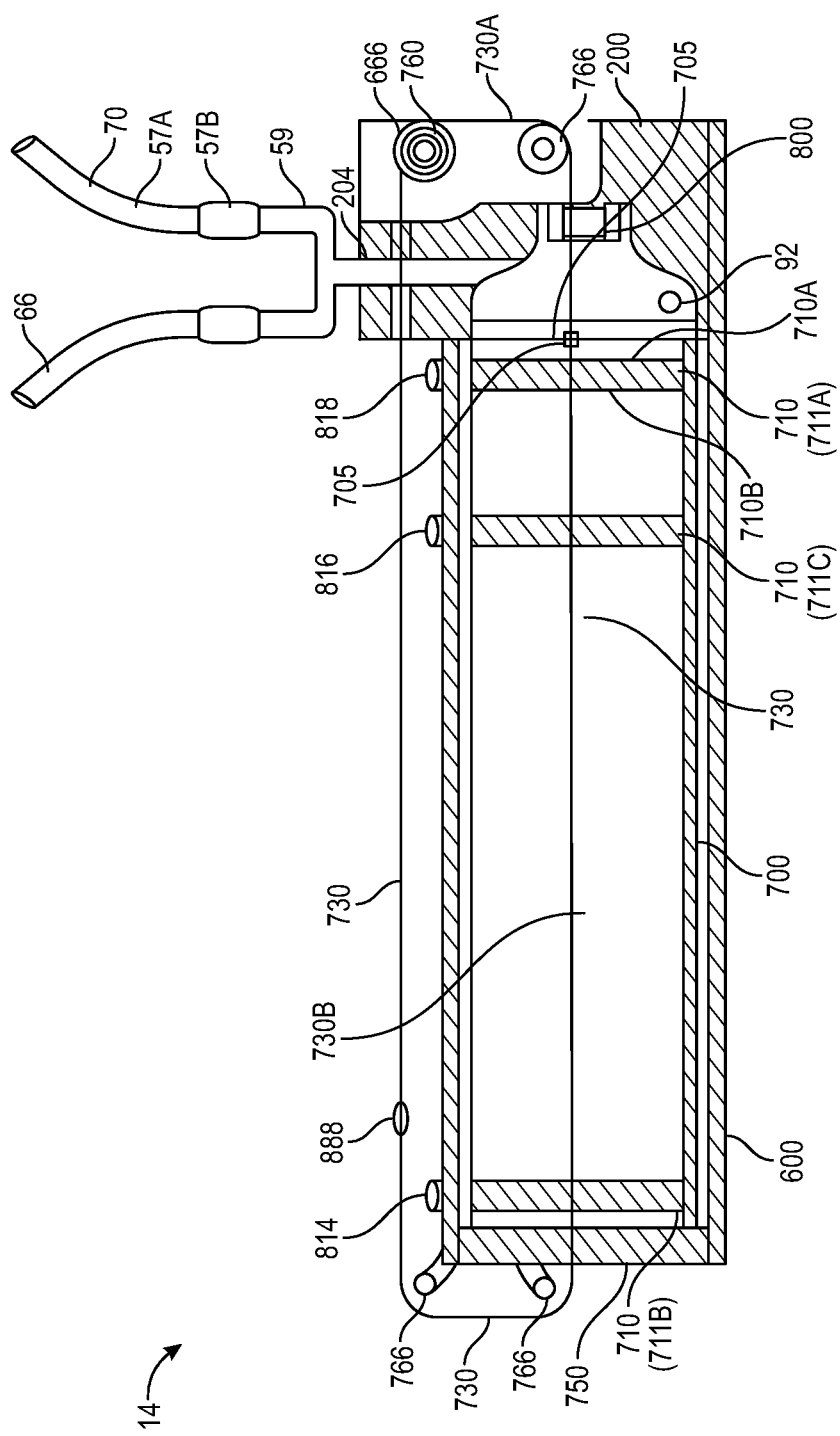
FIG. 9 is a sectional view taken along the line 9-9 of FIG. 2, showing of the pump of the portable toilet.

Referring to FIG. 9 and also to FIG. 3, cable-driven piston-cylinder pump 14 is an assembly that includes a pump cylinder 700, a piston 710 slidingly disposed in cylinder 700, a first cable portion 730A coupled to a first end or front of the piston 710, a second cable portion 730B coupled to a second end or back of piston 710, the union box 200, and a pump cylinder and support stand and rear cover 750 that attaches to the base housing 600, proximal the front of commode 1 (see also FIG. 2). In this embodiment, pump 14 lacks a piston shaft coupled to piston 710, unlike conventional piston-cylinder pumps that include a piston shaft attached to a piston to move the piston. For convenience, union box 200 will define the first end or front of pump 14 and cylinder 700. Thus, the front end of pump 14 faces the rear of commode 1 in this example.

Union box 200, in the present invention, has a rectangular shape with a threaded opening or port 204 that receives intake and exhaust coupling 59 for fluid exchange. Union box 200 has a pump cylinder thread 705 that threadingly receives the first end of a cylinder 700. The second or rear end of cylinder 700 couples and seals to the pump cylinder support stand and rear cover 750. The union box 200 provides fluid communication between the pump cylinder 700 and the coupling 59 to receive water from the inlet tube 64 of the intake fluid path 66 and to discharge water through the discharge fluid path 70. Thus, the union box 200 and the coupling 59 serve as an inlet and exhaust manifold for pump 14.

Continuing to reference FIG. 9, piston 710 is illustrated in three locations or positions 711A,B,C along the length of pump cylinder 700. The first position 711A of piston 710 is disposed close to the pump threads 705 in the union box 200, the second position 711B is distal union box 200 and close to rear cover 750, and the third position 711C is separated from second position 711B by approximately ¾ (three quarters) the distance between rear cover 750 and union box 200. These three piston positions 711A,B,C illustrate where pump piston 710 will travel during each flushing cycle of the typical operation of toilet 1. A flushing cycle may start, as an example, with piston 710 disposed at position 711A, proximal union box 200, and intake stroke would be initiated with cable 730 pulling piston 710 leftward (in FIG. 9) to second position 711B. The second position 711B is where the piston 710 is fully extended to the rear of cylinder 700 and disposed near rear cover 750, corresponding to the completion of the intake stroke. Then a flushing exhaust stroke brings piston 710 to position 711C stopping approximately ¾ of the distance to the initial position 711A. The distance between positions 711B and 711C indicated the amount of water used when flushing the inverted waste container 300. Lastly, the final ¼ stroke from position 711C to position 711A puts fresh water into the waste container 300 for re-use preparation to keep incoming waste loose to assist the cleaning process.

In the example of FIG. 9, first and second cable portions 728, 729 of pump 14 constitute a cable 730 that is looped and attached to the front and back of piston 710. The loop of cable 730 is supported by a plurality of rollers, including, for example, a pump cable drive roller 760. Driven by roller 760, cable 730 is configured to move piston 710 back and forth along the length of cylinder 700, allowing piston 710 to reach the piston positions 711A,B,C as well as other locations. Drive roller 760 is mounted on or adjacent union box 200 and is coupled to dumping arm and pump axle 666 by a pump clutch 130 (FIG. 3) for rotation. Roller 760 may be made of plastic, as an example. The front of the piston 710 will be defined as being disposed nearest to the union box 200, and therefore, the front of piston 710 faces the rear of commode 1, for the sake of conversation.

The cable 730, or more specifically, second cable portion 730B, which connects to the back of piston 710, goes (e.g., extends lengthwise) through a centrally located hole in the pump cylinder rear cover 750 and makes two 90 degree turns on two small rollers 766 disposed on or adjacent the rear cover 750, causing the cable 730 to extend towards the union box 200. Cable 730 continues and protrudes through union box 200 and goes through the center of the pump cable roller 760 and extends out the opposite side of roller 760.

Referring to a rightmost position 711A of piston 710 shown in FIG. 9, on the opposite side of roller 760, first cable portion 730A is wrapped around the roller 760 a plurality of times (e.g. a plurality of wraps) before being connected to the front of the piston 710. From the wraps on roller 760, the first portion 730A of cable 760 continues, extending 90 degrees around another small roller 766 and through a hole in union box 200, accompanied by a cable seal 800. Within pump 14, first cable portion 730A connects to the front of the piston 710. Depending on the location of piston 710 along the length of cylinder 700 and the general configuration of pump 14, the first cable portion 730A, the second cable portion 730B, or both cable portions 730A,B may be wrapped around roller 760. The wraps of cable 730 around the roller 760 there must be enough cable 730 on the roller 760 to follow the piston 710 or for sufficient friction to grasp roller 760. For example, wrapping a selected amount of the cable 730 around the cable roller 760 assures that the roller 760 will move the piston 710 in the desired direction to complete the piston's intake and exhaust stroke. The first cable portion 730A may also be described an exhaust cable or an exhaust string because sufficient tension in first cable portion 730A may be used to remove fluid from pump 14. The second cable portion 730B may also be called intake cable or an intake piston string because sufficient tension in second cable portion 730B may be used to draw fluid into pump 14. Thus, the first cable portion 730A and the second cable portion 730B, and the piston 710 are coupled to a drive element (e.g., drive roller 760, axle 666, or clutch 130) such that movement of the drive element is capable of causing results in the movement of the first cable portion 730A, second cable portion 730B, or piston 2015. As an example, movement of any of the example drive elements results in rotation in cable portion 730A, cable portion 730B, or piston 2015 while clutch 130 is engaged.

Referring to FIG. 2, the cable seal 800, in the current embodiment, is a rubber mount set in a fitted recess in the union box 200, that has a threaded area in front of it for a bolt 881 that keeps the mount in place. A hole is in both the mount and bolt 881 which the cable 730 fits through and the mount tightly squeezes to maintain pressure inside the cylinder.

The cable arrangement described above with reference to FIG. 9 is integrated with a plurality of switches disposed parallel to cylinder 700 and a cable-mounted switch actuator 888. The current embodiment includes three switches 814, 816, 818 disposed linearly along a path on the outer surface of cylinder 700 and aligned with cable 730. Switch actuator 888 is coupled to cable 730 to travel with cable 730 along the path defined by the switches. When triggered by the actuator 888 as it travels with cable 730, any of the switches 814, 816, 818 gives a signal to indicate the direction or position of piston 710. As known in the art, a signal from a switch 814, 816, 818 may be, as examples, an electronic signal such as a voltage level, a current level, an analog message, or a digital message.

As seen in FIG. 3, in the current embodiment, a disinfectant port 91 and plug 92 extend through the side of union box 200 to communicate with fluid drawn into and discharged from pump 14. Disinfectant plug 92 is shown as a solid crystal material attached inside of a screened in area. The screened area may reduce the effect of water force on the rate at which the crystal dissolves. Port 91 and plug 92 are configured to contain pressure inside pump 14. For example, plug 92 or a separate cap may be threaded in to port 91 and may be aided by a gasket to contain pressure.

As seen in FIG. 3 when the motor 111 is initiated, the pinion gear 626 rotates the other four gears. The third gear is the dumping arm and pump gear 655 and it rotates axle 666 that goes through a pump cable roller 760. While the roller 760 is made of plastic it is connected to axle 666 through the pump clutch 130, and when the clutch 130 is turned on, i.e., engaged, while motor 111 is on, they rotate the roller 760 to drive pump 14. As seen in FIG. 9, when the roller 760 rotates it moves the cable 730 which moves piston 710 and switch actuator 888.

Shown most clearly in FIG. 3, portable commode 1 includes a momentary start switch 90 disposed over mechanical box 500 at the top, left, and back section of the portable commode. Start switch 90 is electrically coupled to the electronic system 44 that governs the dumping and flushing operation of toilet 1, including the activation of motor 111 and the various clutches, guided by signals from switches 814, 816, 818 on pump 14. A safety cover 214 (also visible in FIG. 2) with a handle 216 is deposed over start switch 90. A drip tray 218 is disposed at the bottom of box 500, covering an aperture 505 in box 500 through which elevator 12, intake valve 20, and intake tube 64 extend downward during a flushing operation. A control arm 222 is rotatably mounted on a pair of vertically spaced pivots 220A disposed inside mechanical box 500. Control arm 222 extends horizontally at the top of box 500 and couples to safety cover 214. Control arm 222 extends horizontally adjacent the bottom of box 500 and couples to drip tray 218. This arrangement enables both covers 214, 218 to be moved in one manual action. To activate the dump and flush functionality of commode 1, the handle 216 on cover 214 may be rotated to uncover momentary start switch 90 and intake valve 20 simultaneously. The rotation of cover 214 to uncover switch 90 may be from the rear towards the front or clockwise, as an example. When switch 90 is actuated, the electric motor 111 is turned on, causing the five gears to rotate and initiating the dumping and flushing process.

In the current embodiment, accessing and pressing switch 90 (FIG. 3) are the only actions that are to be performed by the operator to begin the electronic sequence which causes all the electromechanical activity needed to cause the self-flushing portable commode 1 to dump and flush itself into another toilet bowl. After someone skilled in the art is taught by this disclosure, the electronic process required to operate the mechanical portion of this current embodiment would be known well to that skilled person, and therefore further detail is not given herein.

Figure 8:
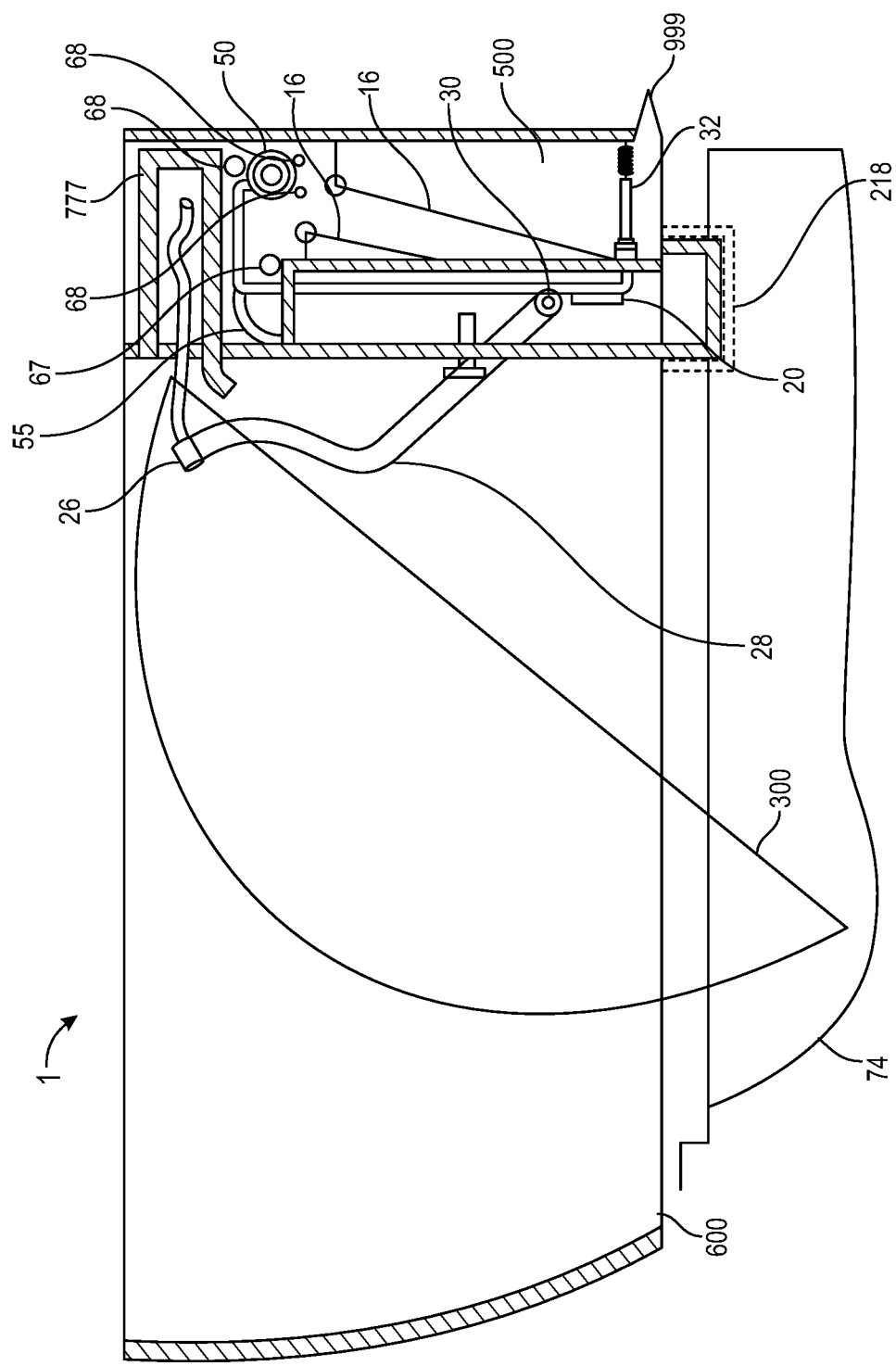
FIG. 8 is another sectional view the portable commode taken along the line 6,7,8-6,7,8 of FIG. 2 showing stages of operation in which the waste container is in an upright position and, alternately, is in inverted position for dumping and cleaning.

As seen in FIG. 3, the union box exhaust coupling 59 is attached to an exhaust hose 57A and an exhaust valve 57B, which together connect an exhaust nozzle 26 to the union box 200, providing the discharge fluid path 70 from the pump 14. As can be seen in FIG. 3 but clearer yet in the vertical sectional view in FIG. 6, the exhaust nozzle 26 is captured by a pair of exhaust nozzle arms 28. Arms 28 hold nozzle 26 within a trough 777 while waste container is in its rest position, as depicted in FIG. 6. Each arm 28 is mounted at a pivot point 30. These two matching arms 28 attach to the side of nozzle 26 and elevate it over the intake tube 64 and the intake tube elevator 12 when arms 28 rotate forward. The arms 28 are both connected to an exhaust nozzle spring 32 disposed behind the pivot 30. Spring 38 biases the exhaust nozzle arms 28 against the waste container 300. As shown in FIG. 8, exhaust nozzle arms 28 will pop out when the waste container 300 rotates out of the way of arms 28. Arms 28 bring nozzle 26 along.

Figure 5:
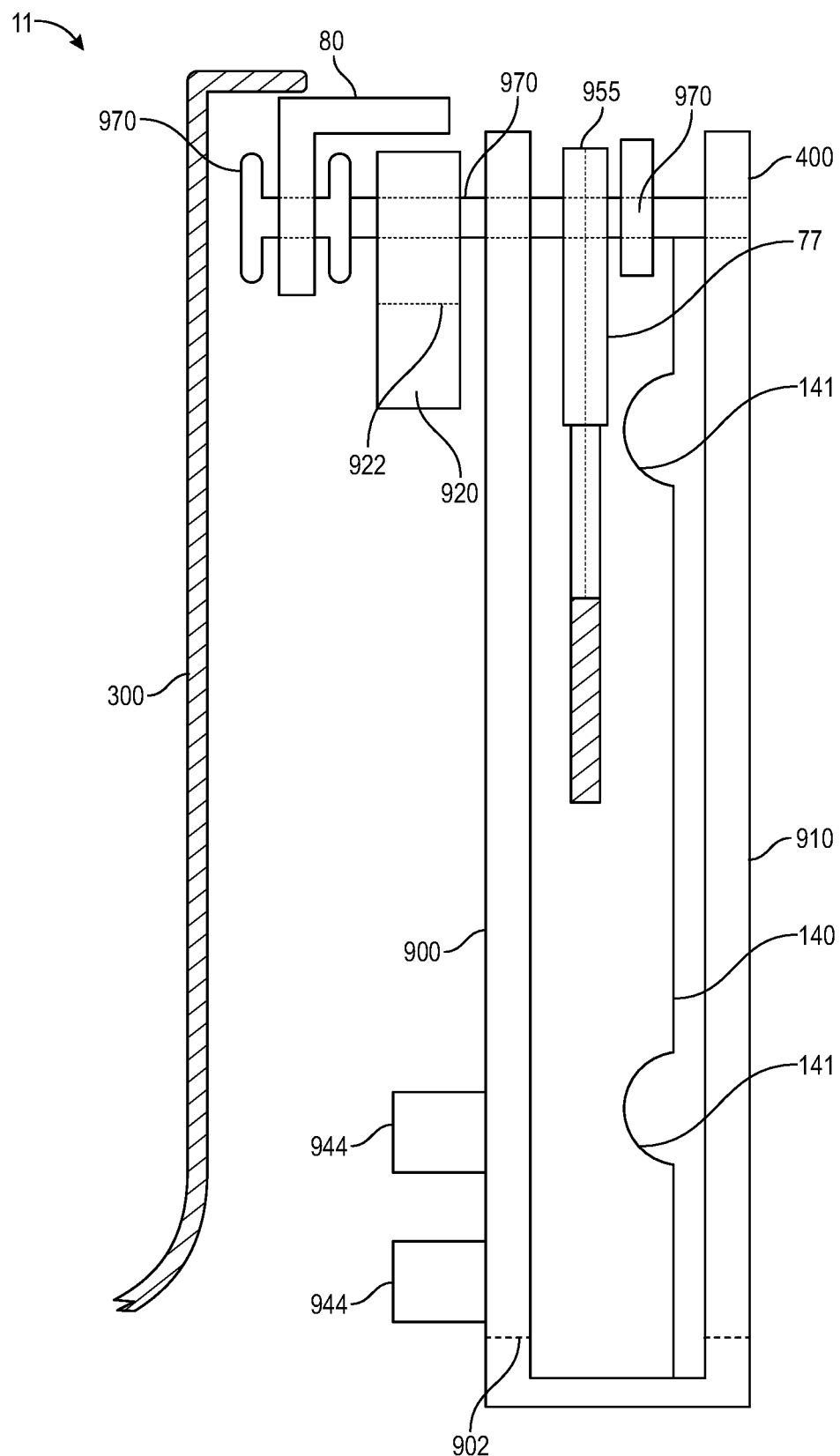
FIG. 5 is a front-facing sectional view taken along the line 5-5 of FIG. 4, corresponding to the upright position of the waste container.

As seen in FIGS. 4, 5, and 8, the waste container 300 rotates out of the way of exhaust nozzle arms 28 through the motor 111 driving the dumping system 11. In particular, as illustrated in FIGS. 4 and 5 showing one of two matching sides, each side of dumping system 11 includes a vertical slotted dumping column 900, which includes a vertically-directed slot 902, a tri-lobed tumbler 920 rotatably bolted by a tumbler bolt and locking nut 970 into the top of the slot 902, and a slotted dumping arm 77. Each dumping column 900 is coupled to and supported by waste containment area bulkhead 400 (FIG. 4 and FIG. 5), which includes a corresponding containment bulkhead access slot 910 aligned with each slot 902. Tumbler 920 includes a pair of curved recesses 922 disposed on opposite sides of a pivot axis (e.g., the center line of tumbler bolt and locking nut 970), and the curved recesses 922 are disposed below the pivot axis and facing downward when dumping arm 77 is in the rest position at the top of FIG. 4. The tumbler bolt and locking nut 970 is rotatably coupled to a slot in the forward portion or end of dumping arm 77. Shown best in FIG. 3, the rearward end of arm 77 is coupled to an electromagnetic dumping arm clutch 120 and is thereby coupled to axle 666 to be rotatably driven by axle 666 and gear 655 when clutch 120 is engaged. By this arrangement, the dumping arm 77 is rotatably coupled to and supported by the base housing 600 and its mechanical box 500. Referring again to FIG. 4 and FIG. 5, when waste container 300 is in an upright position, which may also be called a rest position, tumbler bolt and locking nut 970 and tumbler 920 are disposed adjacent the top of the slot 902, and tumbler 920 extends horizontally, having its lobes pointing downward.

The waste container 300 is coupled to tumbler 920 by a container removal clip 80. Adjacent the bottom of the vertically slotted dumping column 900, there are two vertically separated dumping column tumbling prongs 944 disposed alongside slot 902. In this arrangement, the waste container 300 is slidingly or rotatably coupled to dumping arm 77 and to dumping column 900. The sliding or rotational coupling for waste container 300 includes the removal clip 80, tumbler 920, and tumbler bolt and locking nut 970 constrained to follow an intersection of the slot in arm 77 and the slot 902 in dumping column 900 by engagement with these two adjacent slots. Dumping arm 77, dumping column 900, and, consequently, the bulkhead 400 are supporting structure for container 300.

The tumbler 920 is lowered down the slotted column 900 by rotating dumping arms 77 downward. Waste container 300 traverses downward with tumbler 920 traversing in slot 902. Near the bottom of slot 902, the tumbler 920 tracks into the two prongs 944 by engagement with the curved recesses 922, and tumbler 920 rotates along with the connected waste container 300 until the container 300 hits the front of the mechanical wall box 500 with container 300 in an inverted position (FIG. 8). The compound motion of tumbler 920, e.g., the downward translation followed by rotation, cause tumbler 920 and the attached waste container 300 first to traverse downward and subsequently to rotate backwards and turn upside-down to the dump position shown as dashed lines in FIG. 4. This motion and the dump position allow the waste that may be contained therein to be dumped from the rear of container 300 into the other toilet bowl, which is supporting commode 1. The opposite travel restores waste container to its rest position. In this manner, the combined or compound movement of dumping arm 77 and tumbler 920 configure and drive waste container to move between the upright, rest position and an inverted or upside-down dump position, bi-directionally. The combined or compound movement of dumping arms 77 and tumblers 920 configure and drive waste container 300 to move between a rest position and a dump position and back.

As seen in FIG. 8, as the container 300 moves downward and is rotated, the exhaust nozzle arm 28, which is biased by the nozzle arm spring 32, brings the exhaust nozzle 26 forward and positions nozzle 26 under the front of the now inverted waste container 300. Restoring the waste container 300 and the tumbler 920 back to an upright rest position is accomplished by rotating the dumping arms 77 upward, raising the forward end of arms 77. Once the waste container 300 returns to its rest position it pushes the nozzle arm 28 back into its rest position and the nozzle 26 is recessed into trough 777. As can be seen in FIG. 6, this trough 777 has a spout 778 on it that fits within a slotted area 310 in the waste container 300 and extends into container 300 when container 300 is in the upright position. The raising of the seat cover 38 (indicated in FIG. 3) provides access for a person to sit on the seat 37 and activates a refill button 36 which turns the pump 14 on and deposits Clean water out of the nozzle 26 into the trough 777 and into waste container to keep incoming waste loose. The toilet seat cover 38 as an actuator is optional as the raising of the dumping arms 77 can trigger the electronics system 44 to do the same refill preparation of the container 300. Although, this discussion has focused on a single side of dumping system 11, at least in this embodiment, the movement of container 300 between the upright and inverted positions involves both sides of dumping system 11 working simultaneously.

As seen in FIG. 4, which shows one of two matching sided of dumping system 11, the dumping arm 77 couples to the tumbler bolt and locking nut 970. In FIG. 5, a dumping arm bearing 955 interfaces between the tumbler bolt 970 and the dumping arm 77. As shown in FIG. 3, the rearward ends of the dumping arms 77 attach to a dumping arm hollow axle 77A with a flange. Next to the axle 77A is the dumping arm clutch 120 that is mounted to the mechanical box 500.

The dumping arm and pump axle 666 that connects permanently to the dumping arm and pump gear 655, goes through the dumping arm hollow axle 77A and the clutch 120. The motor 111 having the pinion gear 626 to drive dumping arm gear 655 and axle 666, will raise the dumping arms 77 when the proper electronic designation is sent to the clutch 120 and motor 111, as may be accomplished by electronic system 44.

As shown in FIG. 5 a spring steel waste container lock 140 extends vertically and is positioned to apply pressure on each dumping arm 77 in their raised or lowered position. Lock 140 may be fabricated from spring steel, as an example. The lock 140 is constructed with upper and lower smooth lobes 141. The upper lobe 141 is configured and arranged to be disposed under the corresponding dumping arm 77 when the waste container 300 is in its raised, upright position, supporting it, and the lower lobe 141 is configured and arranged to be disposed over the corresponding arm 77 when dumping arms 77 are down and waste container 300 is in its fully rotated position to maintain this position. This is necessary because the clutch 120 engages and controls the rotation of the dumping arms 77 only during the action of raising or lowering but does not hold arms 77 in place at other times.

Operation: in the current embodiment, after waste is deposited in the flushable portable commode 1 while in the commode chair 2 as shown in FIG. 1, this service is usually provided in a room (s) remote from a residential or commercial building bathroom toilet bowl. Usually the user of the service is someone medically impaired. Once waste is deposited in the bedside commode 1, it is ready to be flushed. As seen in FIG. 1, the operator can then pick up the flushable portable commode 1 from the supporting chair 2, by the handles 980, and carry it to the most immediate residential or commercial toilet bowl with water in it. Then, preferably after raising the toilet seat and cover in the current embodiment, the flushable portable commode 1 most likely should be placed on top of the ceramic part of the bowl. The bottom of the base housing 600 of the portable commode has an opening for two reasons. First, to provide access for the flushable portable commode to intake clean water from the bottom of the said building toilet bowl once the intake tube 64 is lowered into it. Second, for the portable commodes internal rotatable waste container 300 to dump its waste and while still in a dump posture, flush the in-taken clean water through container 300, cleaning it into the said ceramic bowl.

To flush the portable commode 1, the operator must push and hold briefly the start button 90 (FIG. 3). Then, no other action is required of the operator until after the unit finishes flushing into the toilet bowl. At that point the operator can flush the bowl and return the flushable portable commode 1 back to its chair 2 support.

As seen in FIGS. 1, 2, and 3, to initiate flushing, an operator must rotate the handle 216 of cover 220A clockwise, most naturally with their left hand, and then two things happen. First, access is granted to the momentary start switch button 90 so that the operator can press and briefly hold it. Second, because cover 220A is coupled to control arm 222, the rotating of the cover 220A also rotates the valve drip tray 222 underneath the bottom of the housing 600 giving the intake tube 64 clearance to be lowered into the toilet bowl water, as shown in FIG. 7.

As seen in FIG. 6, prior to flushing activity, the intake tube 64 was initially within the mechanical box 500 area along with elevator 12. But as seen in FIG. 7, after the momentary button 90 is briefly held in, the intake tube 64 is lowered into the water in said ceramic toilet bowl 74. This is due to the momentary button 90 sending battery supplied electric power, under the control of conventional electronic mechanism, to the motor 111, and the intake tube clutch 100, as can be inferred from FIG. 3. Whenever the motor 111 is on, all 5 gears shown in FIGS. 1 and 3 rotate. When electronic system 44 activates motor 111 to rotate in first direction and activates clutch 100 to engage, the clutch 100 transfers rotation or torque from the intake reel gear 645 to the intake tube reel axle 54. Consequently, the intake tube reel 50 participates in a first rotation that causes the intake tube 64 to unwrap or unwind and to traverse downward along with the intake valve 20. Consequently, due at least in part to relaxed upward pressure at elevator catch 19 and to tension in bungee 16 (the configuration in FIG. 6), the intake elevator is lowered. Referring now to FIG. 7, eventually elevator 12 reaches a downward extend at which point an elevator stop 808, e.g., a protrusion or ledge or a combination of these, engages and prevents further downward movement of elevator 12, inhibiting further extension of bungee 16. After this event, the valve 20 and the end of the intake tube 64 continue to extend further downward. Ultimately, valve 20 or the end of tube 64 is to extend into the water within the toilet bowl 74.

Referring again to FIG. 3, as the screw reel 50 rotates and unwraps the tube 64, the screw reel 50 also traverses horizontally along the axle 54 leftward, towards clutch 100, assisted by reel finger 119. This leftward movement of reel 50 has the purpose of moving the now-empty portion of reel 50 out-of-the-way of the tube 64 as it unwinds. A reel busy relay 806 is connected to the electronic system 44 to indicate when to stop motor 111. Relay 806 is disposed proximal the clutch 100 and therefore is activated after reel 50 has moved to the leftmost position intended for reel 50. At least in this situation, the activation of relay 806 indicates that reel 50 and tube 64 are unwound, e.g., fully or sufficiently unwound. Also, a reel rest relay 804 is disposed distal clutch 100 and will be activated when the reel 50 later returns to its rest position, having rewound the tube 64. Therefore, the activation of relay 804 indicates intake tubing 64 is wound, e.g. fully or sufficiently wound on reel 50 to be retracted into commode 1.

As seen in FIGS. 3 and 9, the pump cable drive roller 760 is connected to the motor 111 by the pump clutch 130, the pump axle 666, and gear 655, in addition to gears 626 and 637. When motor 111 rotates the pump cable roller 760, roller 760 pulls or winds the cable 730 in one of two directions and moves the piston 710. The motor 111 and pump clutch 130 are directed by electronic system 44, which can, in this embodiment, change the rotational direction of motor 111 to change the direction of movement of the cable 730 and thus the piston 710 so that the intake and exhaust action can be taken by the pump. Hence, with the said intake tube 64 or valve 20 disposed in the toilet bowl water and the reel 50 touching the reel busy relay 806 to activate relay 806, the electronic system 44 detects these conditions and sends a signal so that the pump piston 710 begins the intake stroke. The signal from electronic system 44 activates the pump clutch 130 and activates motor 111 to rotate in an appropriate direction to accomplish the intake stroke, which involves forward movement of piston 710, which is shown as leftward in the view of FIG. 9. The intake check valve 20 opens to allow water to flow into the cylinder 700. During the movement of the cable 730 and piston 710, the cable mounted switch actuator 888 travels with the cable 730. Switch actuator 888 actuates the switch 814 when piston 710 reaches the front end of cylinder 700. In this embodiment, switch 814 may be described as an intake halt and polarity change and intake reverse switch. In this example, piston 710 starts the intake stroke from position 711A, which is proximal union box 200, and stops at position 711B, adjacent switch 814, and distal union box 200. As observed in FIG. 3, when electronic system 44 receives the signal from switch 814, electronic system 44 activates the clutch reel 100 and commands motor 111 to induce a second or reverse rotation of the hose reel 50, bringing the intake tube 64 and valve 20 back into the mechanical box 500. When the intake tube 64 raises onto the box 500, tube 64 grabs the elevator catch 19 and brings elevator 12 back to its rest position within the box 500 as well. In this embodiment, the rotational direction of motor 111 during this rewinding of intake tube 64 may be, as an example, the reverse of the first direction of rotation implemented by the motor 111 during the process of unwinding tube 64 from hose reel 50. While rewinding, the reel 50 moves to the right along axle 54, away from clutch 100. When the reel 50 reaches the rightmost position intended for reel 50, it stops on the reel rest relay 804 to activate relay 804, shutting off the reel clutch 100 and turning on, the container dumping arm clutch 120, as governed by electronic system 44.

The reel 50 can also rotate in a stationary position (not move horizontally while rotating) and the associated relays can be connected to the tube 64 or screw onto the reel with an arm or actuator moved by the screw portion of the reel 50 or other common and logical actuation devices.

As shown in FIG. 6, the waste container 300 is in its rest position before the dumping system 11 including container dumping arm clutch 120 begins the process of dumping the waste container 300. While at rest the container 300 is pressing against exhaust nozzle arm 28. The nozzle arm 28 captures the exhaust nozzle 26 which is currently recessed into the trough 777. The nozzle arm 28 is biasing against the waste container 300 as it holds the arm 28 in. Shown in FIG. 5 is a front view of the container dumping arms 77 connecting to the tumbler bolt and locking nut 970 with a bearing 955 interfaced between the two parts. The waste container clip 80 is designed to clip on and off of the bolt and locking nut 970, and currently the container 300 is clipped to clip 80 when container 30 is in its waste receiving condition.

As shown in FIG. 4 in dashed lines, once the motor 111 and the container dumping arm clutch 120 are initiated as describe above, the dumping arms 77 (shown in dashed lines) are brought down and the tumbler 920 trips over the first and second posts 944. Notice that the posts 944 are positioned low on slotted dumping columns 900 to allow the waste container 300 to clear (e.g., to move downward, away from) the housing cover 40 and seat cover 37 before dumping. As shown in FIG. 8, the waste container 300 and dumping arm 77 are in the dump position and the exhaust nozzle arms 28 have popped out directing the exhaust nozzle 26 towards the interior of the waste container 300. When in this downward dump position, the dumping arm 77 contacts or otherwise activates the dumping arm busy relay switch 876. This initiates the electronics system 44 to begin the pump 14 exhaust stroke while the container 300 stays in its dumping condition.

As can be considered in FIG. 9, the piston 710 travels from second position 711B to third position 711C, approximately ¾ of its full travel distance, forcefully discharging cleaning water into the inverted waste container 300 to clean it into the receiving toilet bowl. When piston reaches position 711C, the cable mounted electronic switch actuator 888 trips the exhaust halt switch 816, which in some embodiments include relay and may also be called a pump exhaust halt relay. Then, switch 816 sends a signal to the motor 111 and container dumping clutch 120 via electronic system 44 to raise the container dumping arms 77 and thus return the waste container 300 and the exhaust nozzle arms 28 and the nozzle 26 upward, back to their rest position, as can be observed in FIG. 6. In this process, tumbler 920 again rotates as a result of interacting with tumbling posts 944, causing waste container 300 to be returned to an upright position prior to completing the upward movement.

In FIG. 4, the container dumping arm 77 having been raised is now resting against the dumping arm rest relay 874. This relay 874 sets up the electronic system 44 so that when the seat cover is raised it will actuate the refill button 36 as seen in FIG. 3. Electronic system 44 will activate motor 111 and pump clutch 130 to cause pump piston 710 to travel from position 711C to the position 711A, and the last of the water in the pump 700, 25% of the prior total, will be discharged into the waste container 300. Since the exhaust nozzle 26 is encapsulated into the trough 777, this fill water will flow from nozzle 26, over spout 778, and into the clean waste container 300, as shown in FIG. 6. For various embodiments, the activation or tripping of the rest relay 874 by the dumping arms 77, which was described above, accomplishes the filling of water into the upright container 300 with or without the actuation of toilet seat 36 or with or without actuation of a refill button 36.

Description of a Second Embodiment

Figure 10:
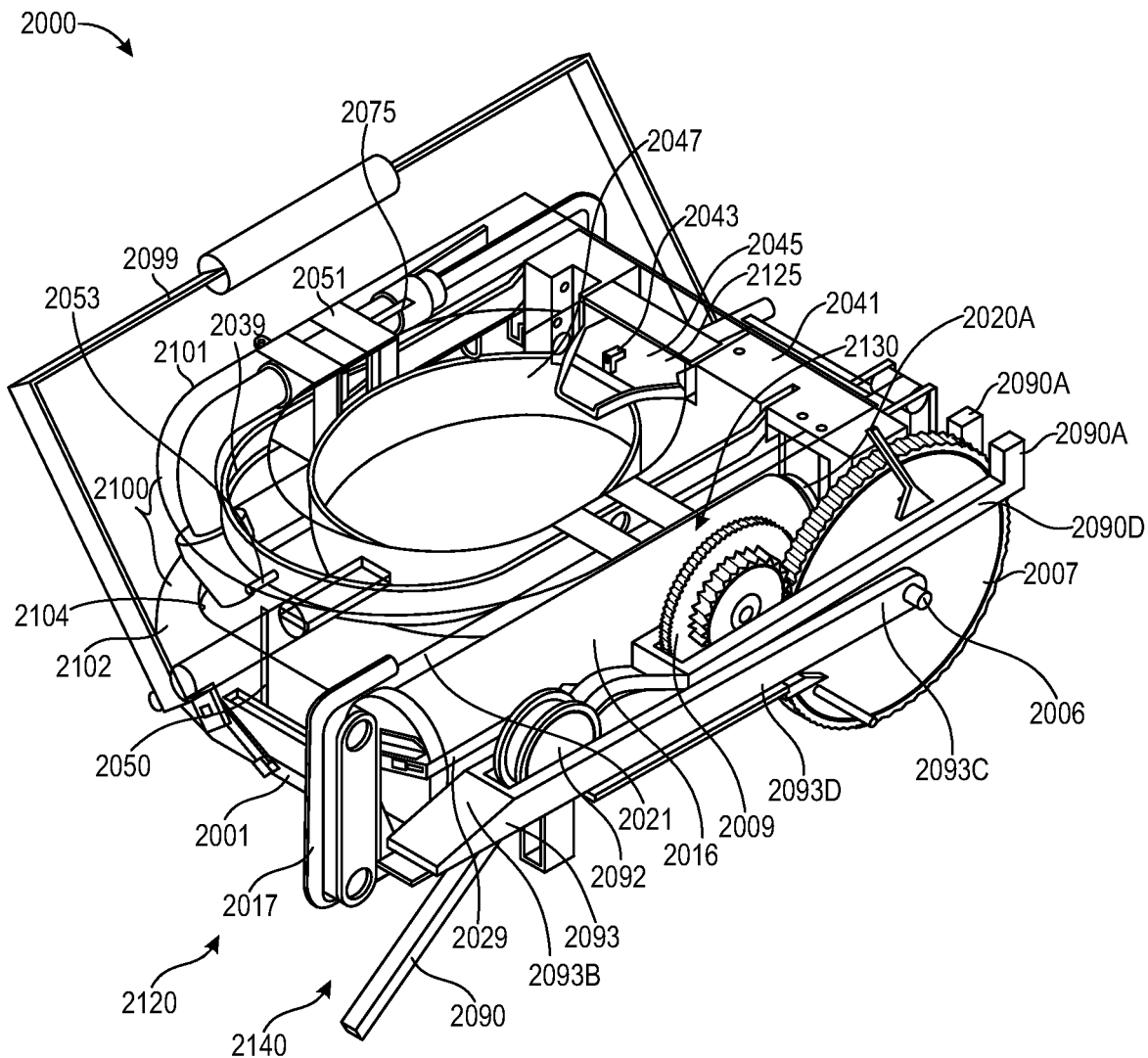
FIG. 10 is a right-front isometric view of an embodiment of a foot pedal operated flushable portable commode in accordance with principles described herein.
Figure 11:
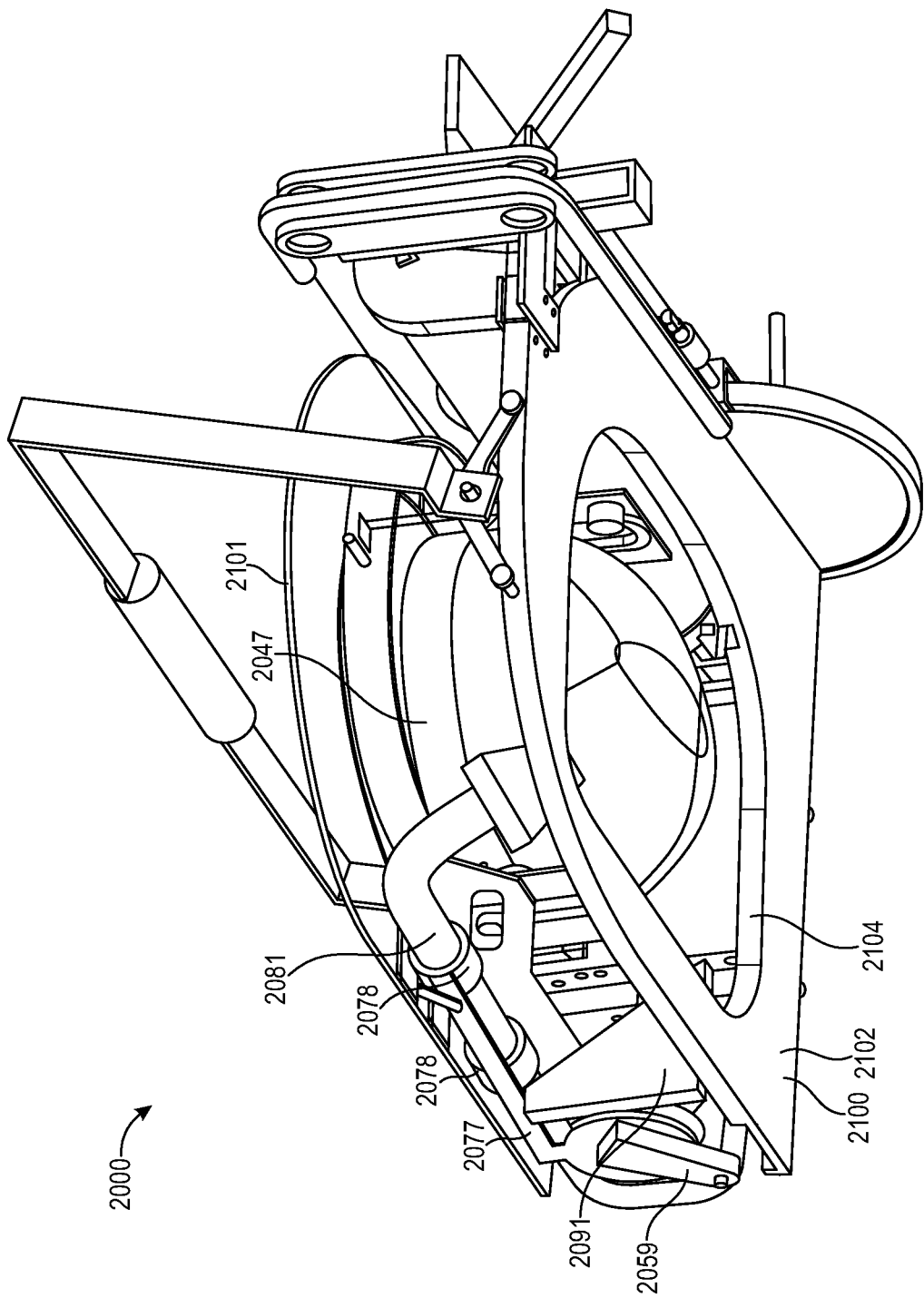
FIG. 11 is a lower left-front isometric view of the portable commode of FIG. 10.

FIGS. 10 and 11 show an embodiment of a foot pedal operated flushable portable commode 2000 which comprises a housing 2100 (depicted by its upper and lower plates 2101, 2102), an attachable waste container 2047, and a flushing and dumping system or assembly 2110 that couples waste container 2047 to housing 2100 rotatably, in a configuration that allows container 2047 to be dumped and flushed while commode 2000 sits overtop a conventional commode or, equivalently, toilet, such as may be found in a residential or commercial bathroom. For convenience, the orientation of commode 2000 is designated by a reference number 2001 near the front of the unit. The flushing and dumping assembly 2110 includes a fluid intake system 2120, a discharge fluid path 2125, and, a dumping system 2130, which incorporate a foot pedal assembly 2140 to provide power for operation.

Figure 12:
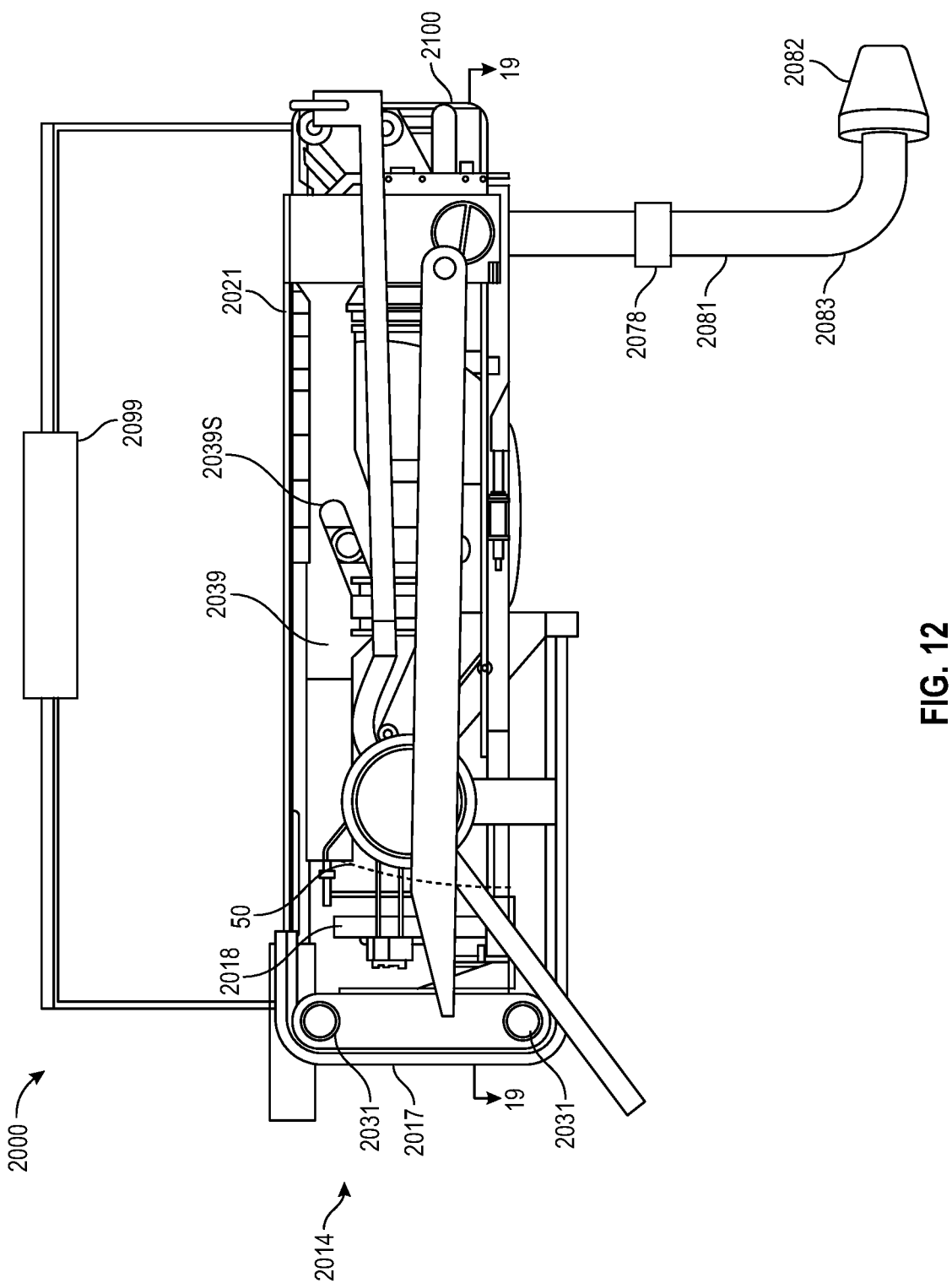
FIG. 12 is a right side view of the portable commode of FIG. 10 with the intake tube rotated down, ready for temporary installation in another toilet.
Figure 13:
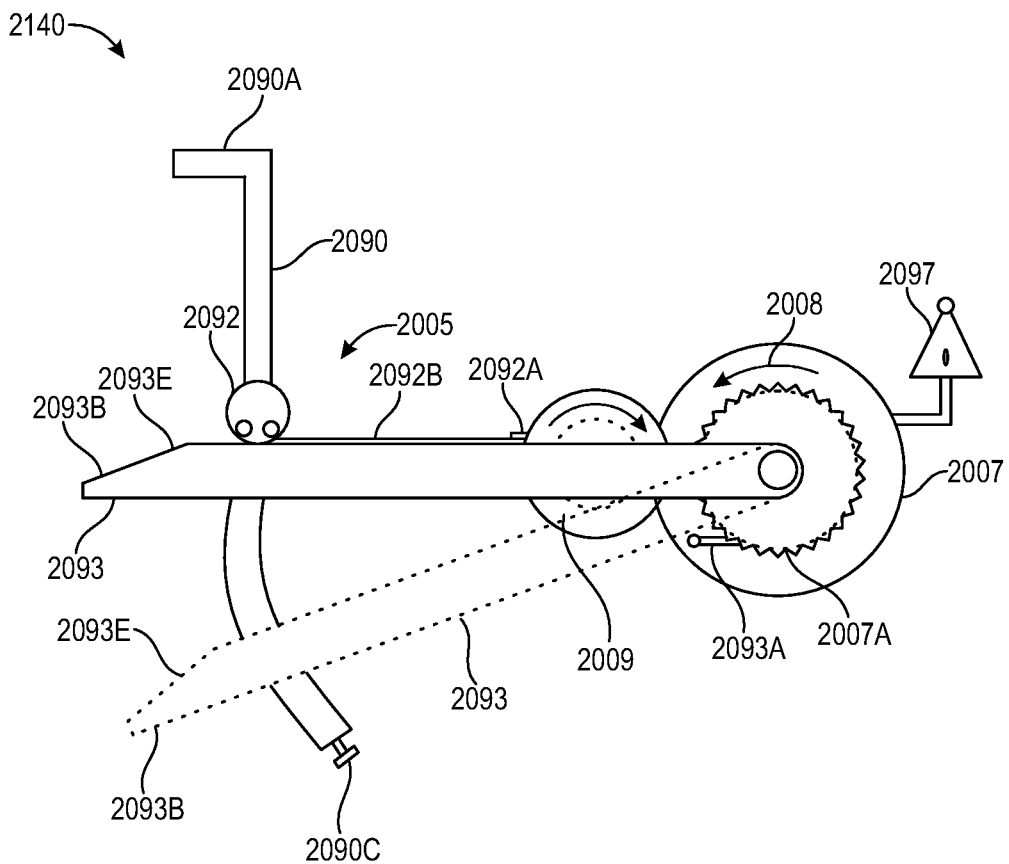
FIG. 13 is a schematic view of components of the portable commode of FIG. 10 with the foot pedal shown in two positions and the pedal stand in an upright position.

FIG. 12 presents a side view in perspective of the foot pedal assembly 2140 in a rest position and shows where assembly 2140 is incorporated into the flushing and dumping assembly 2110 on the right side of the current embodiment. Foot pedal assembly 2140 includes a foot pedal 2093 extending from a foot pad 2093b at a one end to a second end 2093c. Foot pad 2093b identifies a location suited to receive an operator's foot. Just beyond foot pad 2093b, foot pedal 2093 is divided into two arms 2093d separated horizontally by an elongate gap. Arms 2093d, which may also be called pedal arms, and their gap extend to second end 2093c. At second end 2093c, arms 2093d extend around a primary transmission gear 2007 and connect to a pump axle 2006. The primary transmission gear 2007 is also coupled to and supported by pump axle 2006. Pedal arms 2093 also extend around a secondary gear 2009 which meshes with gear 2007, is disposed between pump axle and foot pad 2093, and is supported by a separate axle. As shown in FIG. 13, primary gear 2007 includes additional set of teeth, ratchet teeth 2007a, disposed about the side of gear 2007. A ratchet 2093a is disposed on foot pedal 2093 adjacent primary gear 2007 to interact with the ratchet teeth 2007a and cause gear 2007 to rotate in a forward direction (e.g., counterclockwise in the view of FIG. 13) when pedal 2093 is pressed downward and not to cause gear 2007 to move then pedal 2093 moves upward. A pedal return cap 2093e extends over foot pad 2093b, to allow an operator to lift pedal 2093 after pressing foot pad down, configuring the foot pedal assembly 2140 to accomplish repeated up and down motion and to cause gear 2007 to make repeat rotational steps in the forward direction. FIG. 13 shows two positions for foot pedal 2093, an up position (solid line) and a down position (dashed lines), representing the pedaling or pumping action of assembly 2140. The up position also corresponds to the rest position of pedal 2093.

Foot pedal assembly 2140 also includes a pedal stand 2090 supported on a primary latch pulley 2092 to pivot therewith. The latch pulley 2092 is disposed in the gap between pedal arms 2093d proximal foot pad 2093B when foot pedal 2093 is in a rest position, as shown in FIG. 10.

The pedal stand 2090 protrudes through the center of the primary latch pulley 2092, perpendicular to it axis of rotation. Pedal stand 2090 in configured to rotate with latch pulley 2092 and may slide within latch pulley 2092. Pulley 2092 is mounted from the housing 2100 and coupled to pivot relative to housing 2100. A rest position includes an arrangement in which a component or assembly is positioned or "parked" ready for commode 2000 to be transported or utilized to receive waste. In their rest positions, food pedal 2093 and pedal stand 2090 are generally horizontal. In front of latch pulley 2092, pedal stand 2090 extends downward, through or below the gap between pedal arms 2093d and below foot pad 2093b. The lower end of the pedal stand 2090 includes a stand adjustment toe 2090c which, in the current embodiment is threadingly received and may be screwed in and out to adjust the length, e.g., the height, of pedal stand 2090, like several conventional table and platform leg adjustments known in prior art. Behind latch pulley 2092, pedal stand 2090 includes a bend and divides into a pair of arms 2090# that extends horizontally toward the rear of commode 2000, described in the rest position shown in FIG. 10. Arms 2090d, which may be called handle arms, extend along opposite sides of gear 2009 and gear 2007, and each includes a stand palm rest 2090a at their distal ends, adjacent gear 2007.

Figure 14:
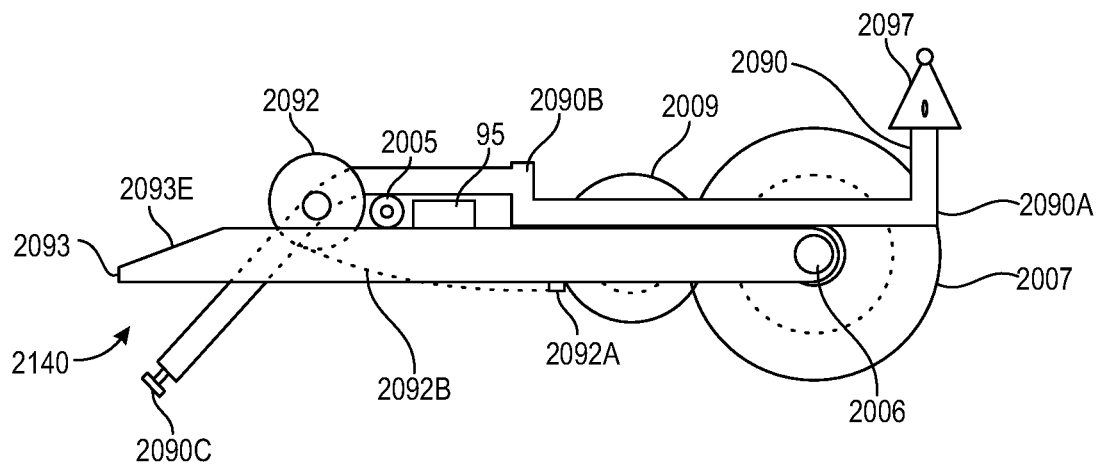
FIG. 14 is a schematic view of components of the portable commode of FIG. 10 with the pedal stand in a horizontal, rest position.

The pedal stand 2090 is also shown in its rest position in FIG. 14, laying over both primary and secondary gears 2007, 2009 and held in this generally horizontal position by a system lock 2097 that is pivotally mounted to engage a handle tine 2090d at, for example, a stand palm rest 2090a. For the current embodiment, system lock 2097 is configured to be rotated towards an operator at the front of the commode in order to release the pedal stand 2090 and rotate it into a vertical support position, as shown in FIG. 13. When the pedal stand 2090 is in its vertical support position, it rests on a section of the stand 2090 called a stand pulley catch 2090b. The primary latch pulley 2092 is configured to match the stand pulley catch 2090b which is fitted to keep the stand in a vertical and slightly angular position to provide structural support for unit later when foot pedal 2093 is pressing down by the operator's foot.

The primary latch pulley 2092 is connected to the primary latch 2092a by the primary latch spring and cable 2092b and the spring forces the latch 2092a against the secondary gear 2009 enabling the locking of gears 2009, 2007, which will be useful when the gears are ratcheted to operate a pump 2014.

Figure 15:
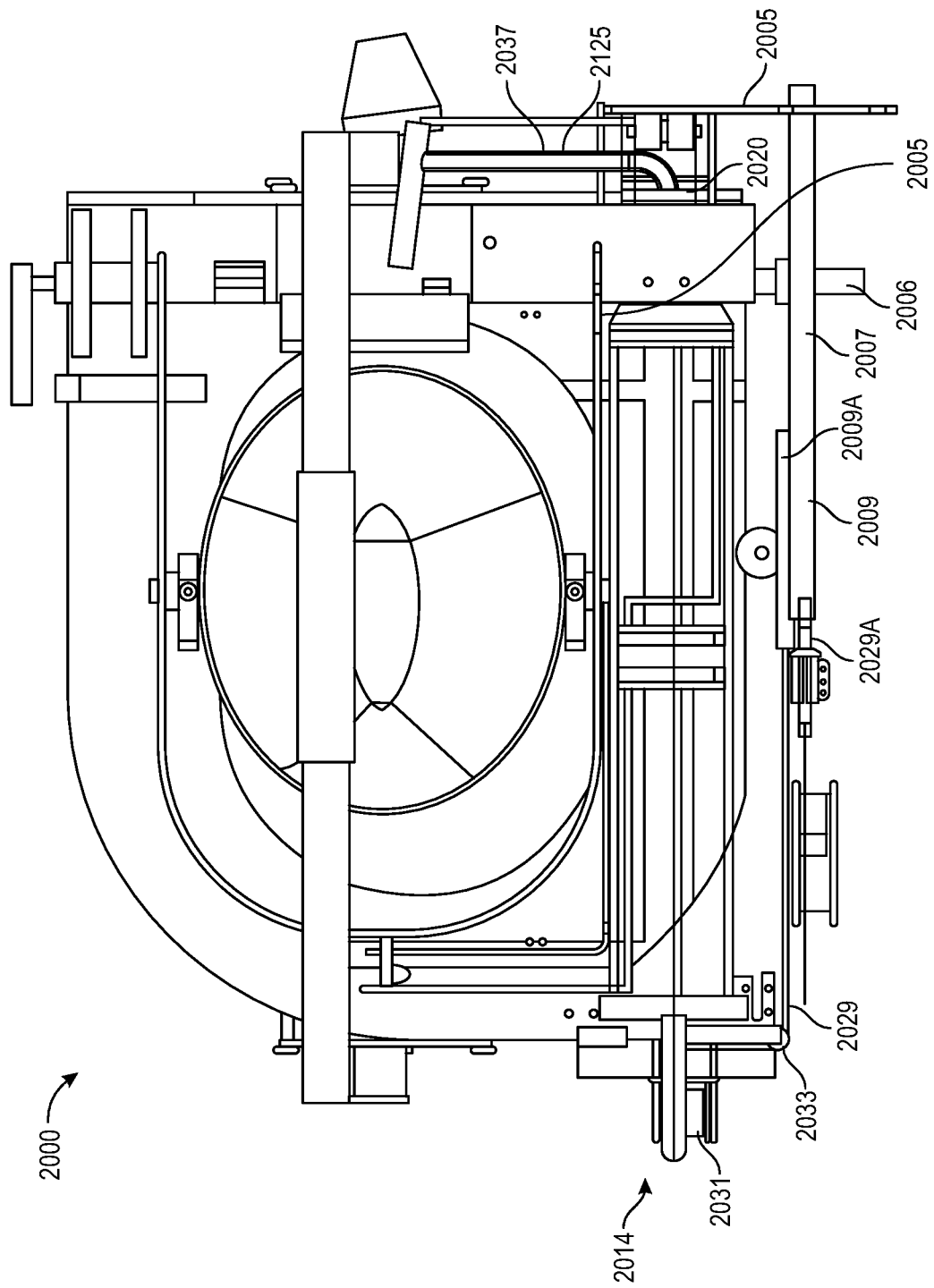
FIG. 15 is a top view of the portable commode of FIG. 10 with the pump cylinder shown open with the piston visible; wherein, several components are not shown, for clarity.
Figure 16:
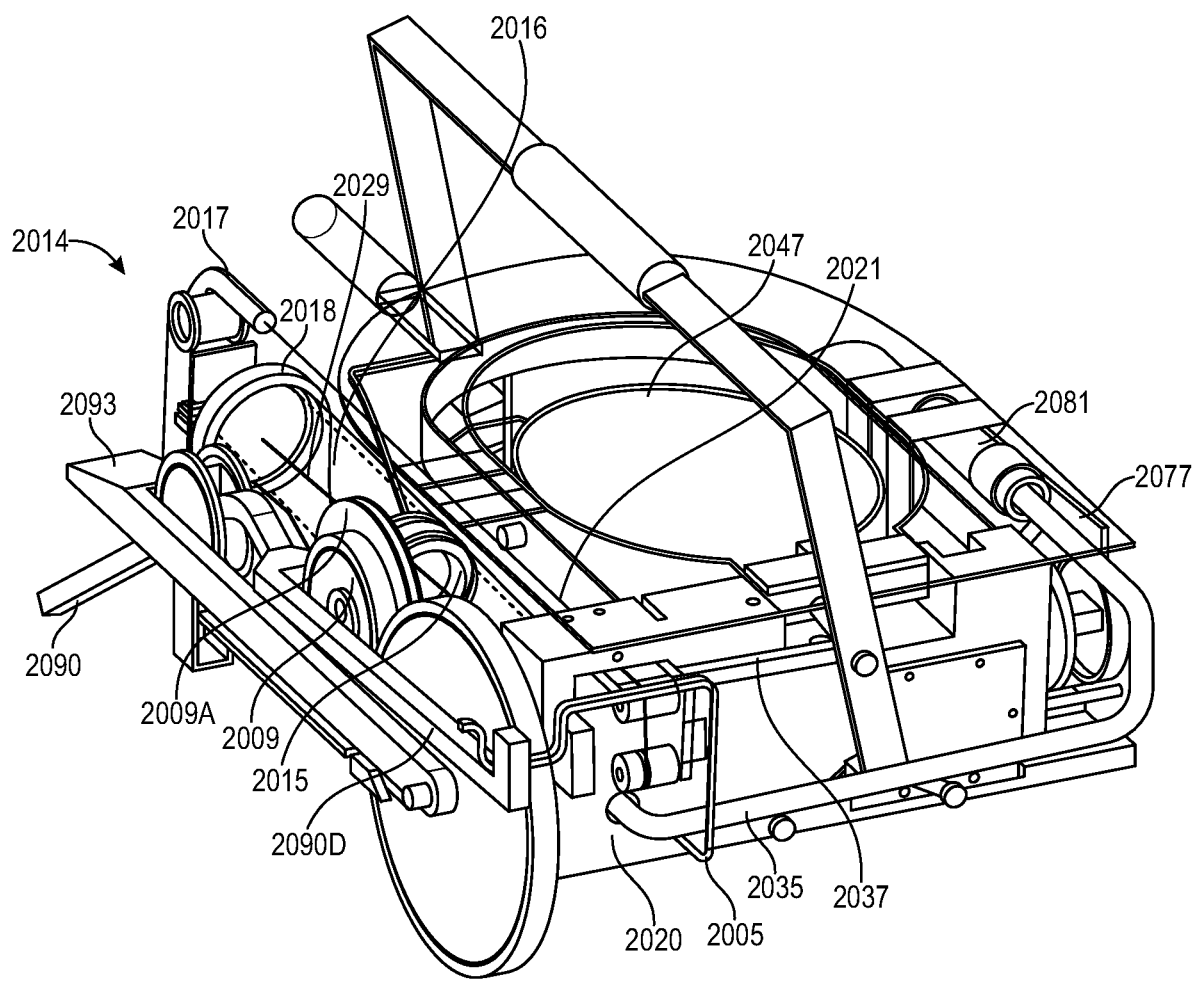
FIG. 16 An right-rear isometric view of the portable commode of FIG. 10, showing an internal view of the pump with pump's cylinder shown partially transparent.
Figure 17:
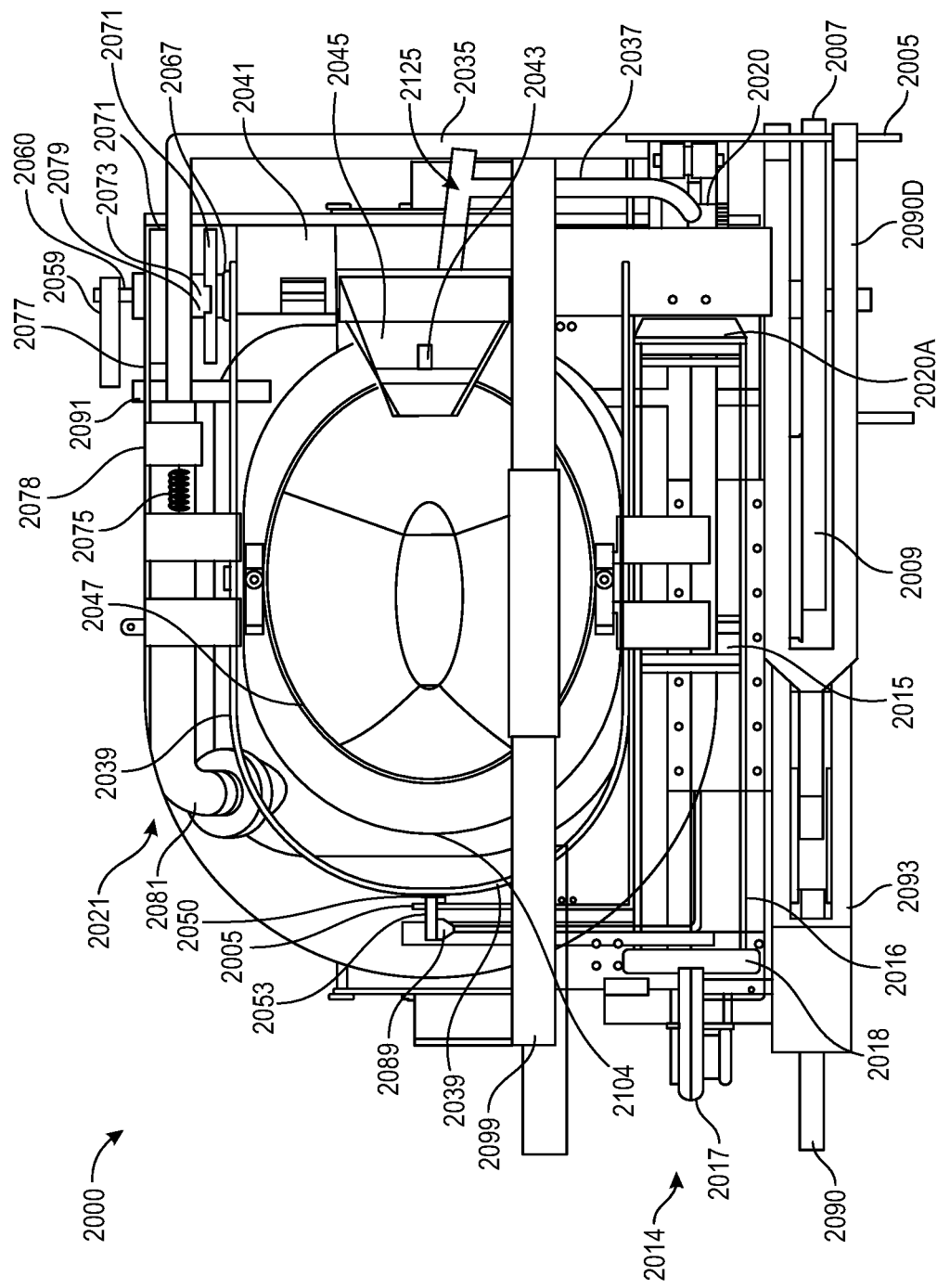
FIG. 17 is a top view of the portable commode of FIG. 10.

Referring to FIGS. 15 and 6, pump 2014 is a cable-driven piston-cylinder assembly that includes a pump cylinder 2016, a pump piston 2015 slidingly disposed in cylinder 2016, a first cable portion 2021 coupled to a first end or front of the piston 2015, a second cable portion 2029 coupled to second end or back of piston 2015 (FIG. 16), a union box 2020, and a pump cylinder support stand and rear cover 2018. On cylinder 2016, union box 2020 functions as an end cap coupled for fluid communication with an intake fluid path and a discharge fluid path. Pump 2014 also includes an extendable and retractable resilient member, which in this embodiment is a bungee spring or bungee 2017, coupled to the front of the piston 2015 by first cable portion 2021 to bias piston 2015 toward the union box 2020 to expel water from cylinder 2016. In this embodiment, pump 2014 lacks a piston shaft coupled to piston 2015, unlike conventional piston-cylinder pumps that include a piston shaft attached to a piston to move the piston. The first cable portion 2021 may also be described an exhaust cable or an exhaust string. The second cable portion 2029 may also be called intake cable or an intake piston string because sufficient tension in second cable portion 2029 may be used to draw fluid into pump 2014. For convenience, union box 2020 will define the first end or front of pump 2014 and cylinder 2016. Thus, the front end of the cable-driven piston-cylinder pump 2014 faces the rear of commode 2000 in this example. Union box 2020 is coupled and sealed to the first end of cylinder 2016. In this embodiment, a union box 2020 is connected to pump cylinder 2016 by a venturi 2020a. The second or rear end of end of cylinder 2016 couples and seals to the support stand and rear cover 2018. As shown in FIG. 16, the union box 2020 provides fluid communication between the front chamber of pump cylinder 2016 and intake tube 2081 and its inlet valve via a union box intake tube 2035, for receiving cleaning water, defining an intake fluid path. The intake tube 2035 is coupled to a port on the union box 2020. As shown in FIG. 15, union box 2020 also provides fluid communication between the front chamber of pump cylinder 2016 and the discharge fluid path 2125 for discharging the flushing or cleaning water to waste container 2047. Thus, the union box 2020 serves as an inlet and exhaust manifold for pump 2014. Referring now to FIG. 17, the discharge fluid path 2125 includes a union box exhaust tube 2037 with an exhaust valve and a jet nozzle 2043 coupled to exhaust tube 2037. Exhaust tube 2037 is couple to a port on the union box 2020 for fluid exchange. The discharge fluid path further includes a flushing trough 2045 to which jet nozzle 2043 is attached. Trough 2045 is rotatably mounted to the top of mechanical wall 2041 and lays opens into waste container 2047.

Referring again to FIG. 16, exhaust cable 2021 extends from the front of piston 2015, through venturi 2020a, though a seal on union box 2020 and then rolls on a pair of rollers 2033 coupled the union box 2020, turning 180 degrees, and extends toward the rear of pump 2014, which is in the direction of the front of the commode 2000. Along the top of pump cylinder 2016, exhaust cable 2021 is coupled to the bungee 2017 and extends around pair of bungee rollers 2031 (See also FIG. 12) beyond the rear cover 2018 and is anchored by connecting to the housing 2100 in the current embodiment. A seal surrounds exhaust cable 2021 where it exits the union box 2020. A rubber seal or another suitable material can be used.

Referring to FIGS. 15 and 16, the intake cable 2029 extends from the back of piston 2015 within cylinder 2016, through a hole in rear cover 2018, and is suspended by a pair of pulleys or rollers 2033 at the back of pump 14. As a result, intake cable 2029 turns 180 degrees and extends toward the front of pump 2014, which is in the direction of the front of the commode 2000. Outside and alongside cylinder 2016, the intake cable 2029 is coupled to the pulley of gear 2009 so as to be wound or, equivalently, wrapped thereon during the intake stroke of pump 2014.

Figure 18:
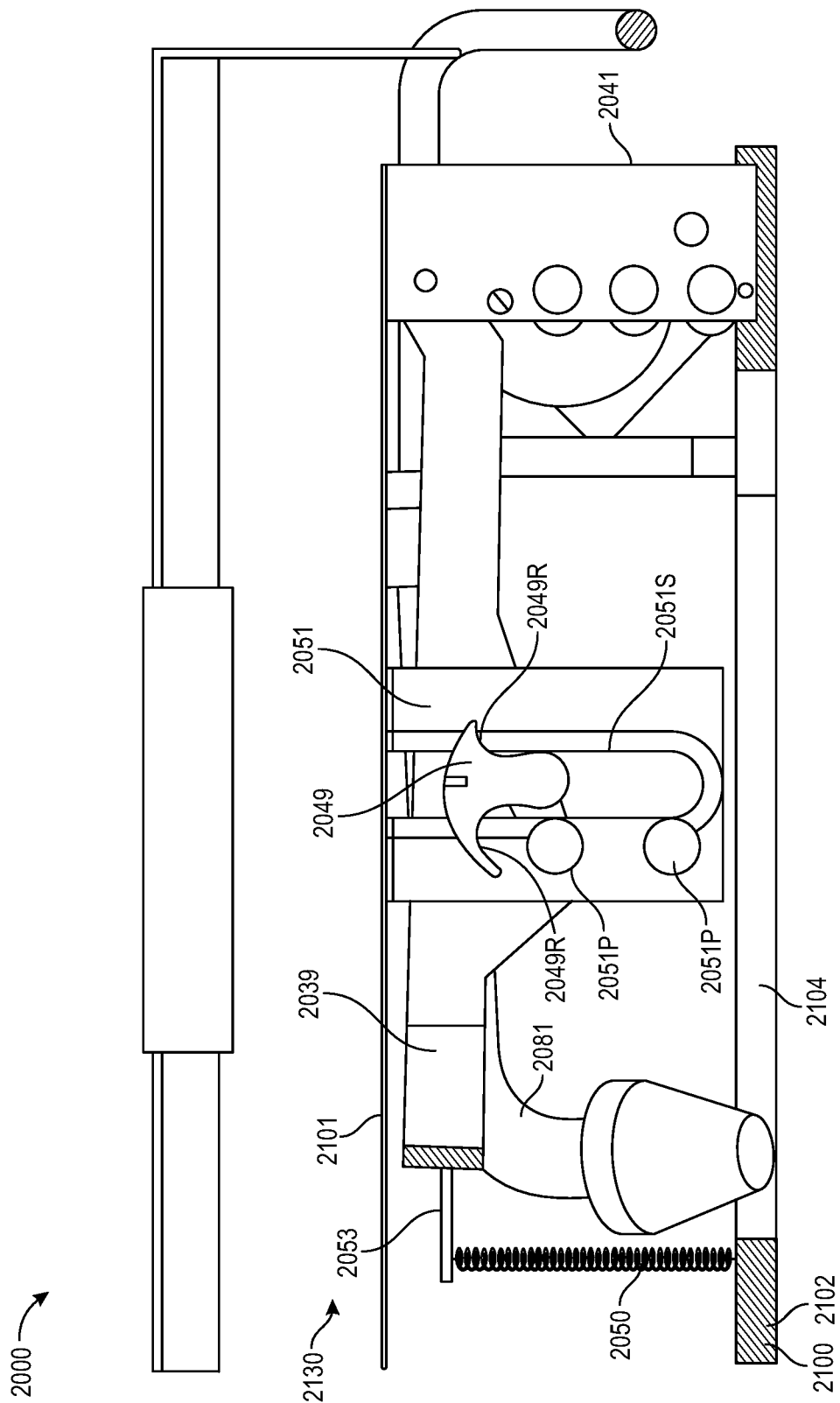
FIG. 18 is a sectional view of the container dumping arm, the tumbler column, and the container dumping tumbler 49 of the commode of FIG. 10 in the rest position.

Referring to FIGS. 17 and 18, dumping system 2130, which may also be called a dumping mechanism, includes a U-shaped container dumping arm 2039 that is rotatably mounted to the housing mechanical wall 2041 in two places at the rear of commode 2000, allowing arm 2039 to pivot down and up. The U-shaped bend of dumping arm 2039 extends to the front of commode 2000, causing arm 2039 to straddle or extend around aperture 2104 of housing 2100. With this arrangement, the housing 2100 and its mechanical wall 2041 are support structures for dumping arm 2039. A container dumping pin 2053 is coupled to the front center of dumping arm 2039 and extends forward. An extendable and retractable resilient member, which in this embodiment is a container dumping spring 2050, is coupled between pin 2053 and housing 2100. In the example of FIG. 18, dumping pin 2053 and dumping spring 2050 are disposed above aperture 2104 and dumping spring 2050 extends vertically down to lower plate 2102 when dumping arm 2039 is in the rest position, as shown. To facilitate dumping, dumping spring 2050 biases downward the U-shaped dumping arm 2039 and the waste container 2047, which is held by dumping arm 2039. In this embodiment, spring 2050 is a latex spring. As best shown in FIG. 12, the left and right sides of dumping arm 2039 each include a centrally-located sloping slot 2039S that slopes downward from the rear toward the front. Shown in FIG. 18, in the current embodiment, there are two tumbler dumping columns 2051 coupled from the top of the housing 2100, e.g. mounted and extending downward from upper plate 2101. Each dumping column 2051 includes a vertical slot 2051S and a pair of posts protruding from the bottom half of column 2051, in front of the vertical slot 2051S. For each column 2051, vertical slot 2051S is generally centered along the left or right sides of aperture 2104 and aligned with one of the sloping slot 2039S on the container dumping arm 2039. A pair of container dumping tumblers 2049, one each, is placed through each pair of aligned and crossing slots 2039S, 2051S of columns 2051 and dumping arm 2039, respectively. The dumping tumblers 2049 are positioned opposite one another, across aperture 2104, and each has a clamp (not shown) to keep it in place within the slots 2039S, 2051S. Like tumbler 920 of FIG. 4, each tumbler 2049 includes a pair of curved recesses 2049R that face downward when dumping arm 2039 is in the rest position shown in FIG. 18.

Continuing to reference FIGS. 17 and 18, the waste container 2047 has a flat boss with posts on each of its sides, and these snap into the tumblers 2049 to enable easy removal and installation of the container 2047 for manual cleaning of container 2047 or other portions of the commode 2000, in case a malfunction of the commode 2000 or another reason arises. Thus, the waste container 2047 is slidingly or rotatably coupled to dumping arm 2039 and to dumping columns 2051. The sliding or rotational coupling for waste container 2047 includes the dumping tumblers 2049 constrained to follow an intersection of the slot in arm 2039 and slot 2051S in dumping columns 2051 by engagement with these two adjacent slots. Dumping arm 2039, the housing 2100, and the tumbler dumping columns 2051 are support structures for waste container 2047.

The additional description of commode 2000 that follows will focus on three operational steps for flushing the portable commode into a toilet bowl. The description will explain more about the configuration of commode 2000 and will explain the mechanical functions or operations associated with each step.

After being used to receive human waste, a caregiver may pick-up the portable commode 2000 by a carrying handle 2099, lifting it from a floor, which maybe the arrangement when commode 2000 is used by a child, or lifting it from a supporting chair (not shown), which may be the arrangement in the case of use by an adult, as examples. The caregiver would then carry commode 2000 to the other toilet bowl.

As a preview of the operation steps, after being set overtop an open toilet bowl, the commode 2000 may be coupled for fluid transfer to the conventional toilet bowl and, as an example, may be coupled to the trap of the toilet bowl. Next, the fluid intake system 2120 of the commode 2000 may be operated to load cleaning water into itself from the toilet bowl. Third, the waste container 2047 is rotated to dump it contents into the toilet bowl, and the fluid intake system 2120 flushes waste container 2047 with the cleaning water via discharge fluid path 2125. The used cleaning water drains into the receiving toilet bowl. While the primary description is given on the foot pedal operated flushing and dumping assembly 2110 of commode 2000, other hydraulic operated, hand operated, and electrically operated embodiments of a flushing and dumping system include and operate with some of the same mechanisms.

Step One: Connecting the Portable Commode to Toilet Bowl

Referring again to FIGS. 11 and 12, while holding the housing 2100 suspended by the carrying handle 2099, e.g., with the right hand, and rotating an intake control handle 2059, an intake tube 2081 with a trap insert-able valve is lowered from within the housing 2100, through an aperture 2104 in the bottom rear section of housing lower plate 2102 and is locked. It should be noted that, in the case of the bedside commode, it may be the choice of the caregiver to lower the intake tube 2081 with the trap insert-able valve while the housing 2100 is still supported in the bedside commode chair. For purposes of this discussion, the caregiver will serve as the operator of commode 2000.

Referring again to FIG. 17, the intake tube 2081 may be lowered and locked as follows: The fluid intake system 2120 includes the control handle 2059, an intake tube axle 2060, and an intake latch-able gear 2063 (a portion is visible in FIG. 19), which are coupled together for mutual rotation. Thus, as the operator rotates the intake control handle 2059 from the rear towards the front of the unit approximately 90 degrees, all three parts 2059, 2060, 2063 rotate together in this same direction.

Figure 19:
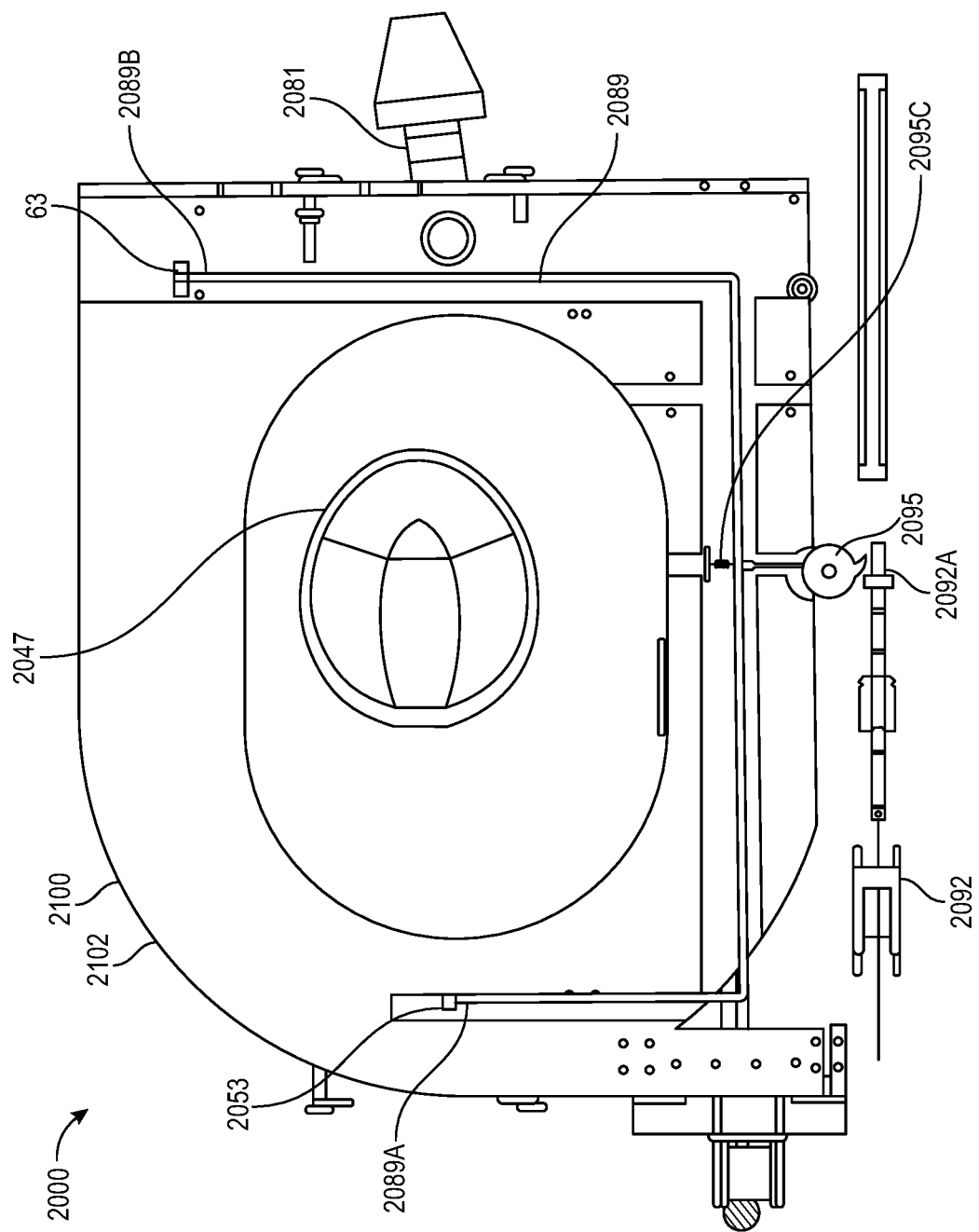
FIG. 19 is a sectional top view taken along the line 19-19 of FIG. 12.

Referring to the sectional top view of FIG. 19, an intake tube gear/container dumping stand latch 2089 is coupled to a spring 2095c that biases the latch 2089 leftward with respect to housing 2100 (upward in the view of FIG. 19), into an opening on the intake latch gear 2063 thus locking that gear. In the current example, latch 2089 is U-shaped and extends from the front to the rear of commode 2000. More specifically, latch 2089 extends from a first end 2089A adjacent the front center of commode 2000, along the right side, and along the rear, terminating at a second end 2089B adjacent gear 2063, which is disposed proximal an intake suspension gear 2067 and control handle 2059 on axle 2060 (features shown in FIG. 4). When gear 2063 is rotated by control handle 2059 and axle 2060, gear 2063 rotates an idler gear 2065 above it, which likewise rotates the intake suspension gear 2067. Connected to the suspension gear 2067 is a lateral suspension spring (not shown) that is encapsulated by two facing lateral caps 2071, which include an inside cap 2071 and an outside cap 2071, the outside cap 271 being disposed closer to control handle 2059. The inside cap 2071 is mounted to the intake suspension gear 2067. The intake suspension gear 2067 is rotatably coupled a mechanical wall 2041 and rotates in conjunction with the idler gear 2065, which rotates by the influence of the intake latch gear 2063, which is coupled to axle 2060 and control handle 2059 for mutual rotation, as described above. It may be noted that the container dumping stand is disposed at the front of commode 2000 on the front end of the U-shaped arm that comprises latch 2089 and operates simultaneously with latch 2089. These features, latch 2089 and container dumping stand, work in conjunction to restrict the waste container 2047 from dumping prematurely. It will be shown during Step 3 how the latch 2089 is the feature that enables the waste container 2047 to dump the waste into the toilet bowl after the intake tube 2081 has retracted into the housing 2100, thus keeping the tube 2081 from being soiled by the waste.

Referring again to FIG. 17, on the outside surface of the encapsulated cap 2071 the enclosed lateral suspension spring (not shown) is attached a suspension arm 2077 (best shown in FIG. 11). A spring bolt 2073 protrudes through the suspension arm 2077, defining an axis about which arm 2077 may rotate. The cap 2071 that covers the lateral spring (not shown) and is coupled to the suspension gear 2067. Referring to FIG. 11, the suspension arm 2077 is rotated downward by actuation of the intake control handle 2059, the suspension arm 2077 moves laterally towards the inside center of the unit as it pushed over laterally by a suspension arm lateral ramp 2091.

The suspension arm 2077 supports intake tube 2081 and includes two separated rings 2078, which slidingly receive the intake tube 2081. Intake tube 2081 is configured to telescope through the separated rings 2078. Encapsulating the intake tube 2081 in between the rings 2078 on the suspension arm 2077 is an intake tube suspension 2073n spring 2079, which in this embodiment is a coil spring. Suitable stoppers are placed between the spring 2079, the suspension arm 2077, and the intake tube 2081 to enable the intake tube 2081 to adjust the position of the rings on the suspension arm 2077 to compensate for different configurations within various types of toilet bowls and their various traps, allowing of suspension arm 2077 to make different movements.

Referring to FIGS. 12 and 19, With the operator holding the unit with the carry handle 2099 in front of a toilet bowl that can receive waste from commode 2000; and having the intake tube 2081 with its trap insert-able valve or seal hanging below the center-rear of the housing 2100 and locked by the latch 2089 protruding into an opening on the gear 2063, the operator positions the entire commode 2000 to steer the intake 2081 into the toilet bowl trap (not shown) as he/she places the housing 2100 on top of the toilet bowl (not shown). The intake tube 2081 has a suitable material or device such as bellow tubing or a catching elbow 2083 that enable the valve area or connectable end 2082 of the intake tube 2081 to bend, to align, and to stabilize as it is steered into the trap of the toilet bowl. The intake tube 2081 with trap insert-able valve is designed to penetrate into the trap to draw water from toilets that may not otherwise have enough water above the trap to enable the flushable portable commode/toilets sufficient siphoning water to clean itself. The intake tube insert-able valve positions the valve within the valve housing to lie towards the bottom of the trap so that it can potentially siphon the greatest amount of water. In addition, the cone shape is designed to seal or reduce leakage when positioned in the trap. The operator may flush the toilet so water from the toilets reservoir can fill the bowl to provide extra water if needed; although, it is anticipated that many trap designs hold sufficient water for use in commode 2000.

Step Two: Loading Cleaning Water into the Portable Commode

Now, with the intake tube 2081 and trap insert-able valve inserted into the toilet bowl the intake stroke through the foot pedal 2093 must be actuated with the pedal stand 2090 on the floor for vertical support. It should be noted that the operator can hold onto the stand palm rest 2090a or the top of the housing or toilet bowl tank covering for support or to stabilize commode 2000. Referring to The two positions of foot pedal 2093 shown in FIG. 13 represent the pumping action of the foot pedal assembly 2140. As the operator uses his foot to push the foot pedal 2093 down, the catch part of the ratchet 2093a on foot pedal 2093 grabs a member of the ratchet teeth 2008 disposed on the side of the primary gear 2007 and causes the gear 2007 to rotate. The primary gear 2007 in turn rotates a secondary gear 2009 which is connected to the adjacent, axially-aligned pulley 2009a. When driven by pedal 2093 and gear 2007, this pulley on gear 2009 pulls and wraps intake cable 2029 (See FIG. 15). The resulting tension in cable 2029 causes the pump piston 2015 to move through the cylinder towards rear cover 2019 at the front of the commode 2000, creating a negative pressure inside the first end of pump cylinder 2016 where union box 2020 is coupled. As shown in FIG. 4 and FIG. 16, As a result of the negative pressure, the exhaust valve in exhaust tube 2037 closes, the trap insert-able valve in the intake tube 2081 opens and water is siphoned from the toilet bowl into the first end of pump cylinder 2016. Thus, the second cable portion or intake cable 2029 is coupled to a drive element (e.g., pedal 2093 or a rotating element, which include pulley 2009a or gear 2007) capable of causing intake cable 2029 and piston 2015 to move.

Thus, referring to FIG. 4A in FIG. 16, as the foot pedal 2093 is depressed, piston 2015 is pulled toward the front of commode 2000 because piston 2015 is connected by the intake cable 2029 to gear 2009, which is driven by gear 2007 and foot pedal 2093. As a result of piston 2015 moving, more of the exhaust cable 2021 is drawn in though the union box seal 2025 into cylinder 2016, pulling and stretching bungee 2016 and storing potential energy therein. Repeated up and down pumping of foot pedal 2093 draws additional water into cylinder 2016. In some embodiments, a single stroke of pedal 2093 draws sufficient water into pump cylinder 2016.

Referring to FIG. 13, with the foot pedal 2093 fully down and the intake stroke of the pump piston 2015 completed, the pump cylinder 2016 is full of cleaning water siphoned from the toilet bowl. The primary latch 92a has locked the secondary gear 2009, disallowing cable 2029 from unwinding and holding piston 2015 in-place. At the same time, in competition, the exhaust cable 2021 and its associated bungee 2017 are biasing the piston 2015 toward union box 2020 and are ready to exhaust water from the cylinder 2016. Thus, the first cable portion or exhaust cable 2021 is coupled a drive element (e.g., bungee 2017) capable of causing the exhaust cable 2021 and piston 2015 to move.

The union box 2020 has as one of its purposes the sealing of the pump cylinder 2016 when exhaust cable 2021 moves. Cable movement occurs, for example, when tension in the exhaust cable 2021 causes piston 2015 to move toward union box 2020 and discharge the pump piston 2015 on the exhaust stroke.

Step Three: Flushing the Portable Commode

Figure 20:
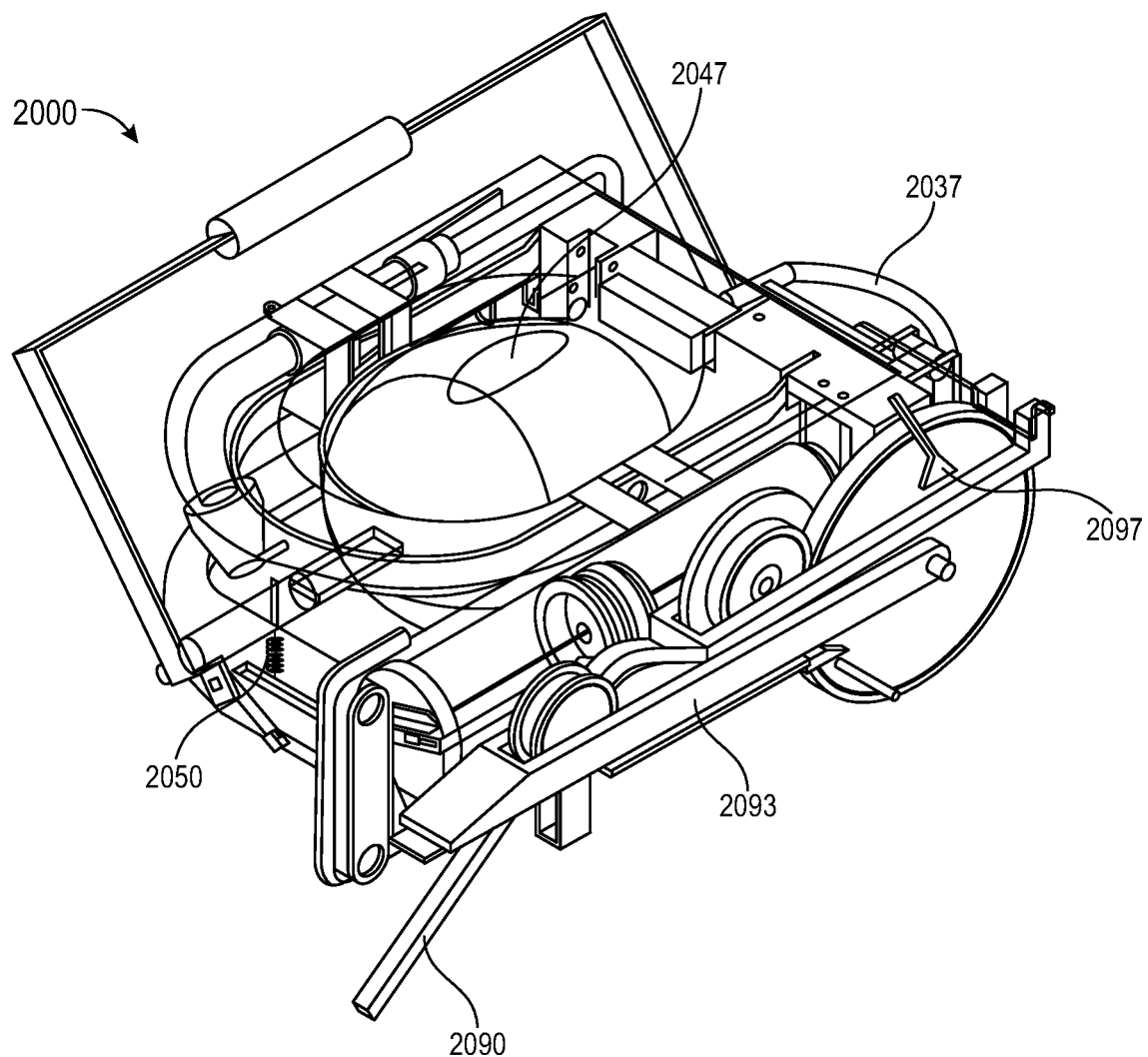
FIG. 20 shows a front-right isometric view of the commode of FIG. 10 with the waste container inverted for dumping or for rinsing/flushing.

Referring to FIG. 20, after the pump cylinder 2016 of the commode 2000 is loaded with cleaning or flushing water from the toilet bowl and the waste container 2047 has waste that needs to be dumped into the toilet bowl, the intake tube 2081 is retracted back into the housing before the waste container dumps and the flushing water cleans the dumped waste container 2047. As in Step One above, when the intake tube 2081 was lowered, the intake tube/container latch 2089 was activated by the spring 2095C (see FIG. 19) to latch the intake latch-able gear 2063 by contact with the second end 2089B of latch 2089. At its first end 2089A, latch 2089 works as a stand to uphold the container dumping pin 2053, which is shown most clearly in FIG. 17 and FIG. 21. The latching and unlatching of dumping pin 2053 and gear 2063 by latch 2089 coordinates the waste container dumping and the intake tube retraction to occur simultaneously. When the intake tube 2081 was lowered by the intake control handle 2059, the pedal stand 2090 was locked in a rest position by a system lock 2097 (FIG. 14). As shown best in FIG. 10 and FIG. 14, when the pedal stand 2090 was locked, it pressed down on a seesaw 2005 (shown in FIG. 17 and FIG. 15), which raised the container dumping pin 2053 to an up position. However, since the intake tube/container latch 2089 was initiated first during the lowering of the intake control handle 2059, the container latch 2089 was positioned under the container dumping pin 2053 before the seesaw 2005 is released by the pedal stand 2090. When container latch 2089 is under the container dumping pin 2053, as just described, the container dumping spring 2050 is restrained from pulling-down the dumping pin 2053 and the coupled container dumping arm 2039, preventing the dumping the waste container 2047.

Figure 21:
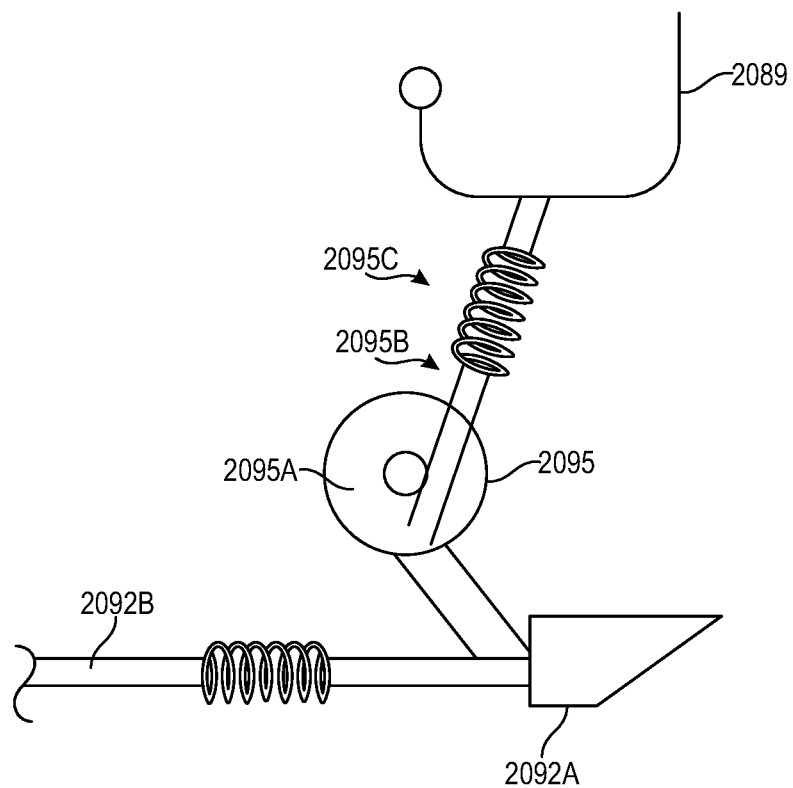
FIG. 21 is a schematic view of the container latch and the bypass coordinator features of the portable commode of FIG. 10.
Figure 22:
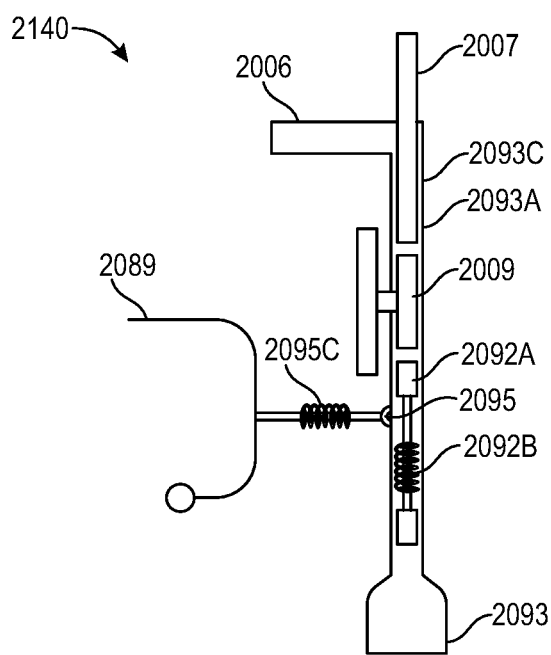
FIG. 22 is a schematic view of the foot pedal, and latching features, including the bypass coordinator of the portable commode of FIG. 10.

As can be understood from the sequence of FIG. 13 and FIG. 14, when the pedal stand 2090 is returned to its generally horizontal rest position, it rotates the primary latch pulley 2092, which pulls the latch spring and cable 92b and retracts the primary latch 2092A from secondary gear 2009, releasing gear 2009 to rotate. Referring now to FIG. 21, FIG. 22, and FIG. 19, as the primary latch 2092A is retracting, it catches and rotates an intake/container bypass coordinator 2095, which temporarily pulls the tube/container latch 2089 to the right (down in the view of FIG. 19) and causes the simultaneous, double release of the intake latch-able gear 2063 and the container dumping pin 2053. After these are released, referring again to FIG. 17, an extendable and retractable resilient member, a vertical spring 2075, retracts the intake tube 2081 from the toilet bowl, rotating the suspension arm 2077 upward to bring tube 2081 back to its rest position in the housing 2100. The container dumping arm 2039 (which previously had been held-up by the container dumping pin 2053 while sitting on the container/tube latch 89) is pulled down by the spring 2050 (compare FIG. 18 to FIG. 23). The downward rotation of arm 2039 induces container 2047 to invert and dump backwards, which will be discussed in greater detail below. At the same time, the primary latch 92a releases the secondary gear 2009, allowing the bungee spring 2017 and piston 2015 to forcefully discharge water from the pump cylinder 2016 through the venturi 2020a, the union box 2020, the exhaust tube 2037, and the flushing jet nozzle 2043, and onto the inverted waste container 2047.

Figure 23:
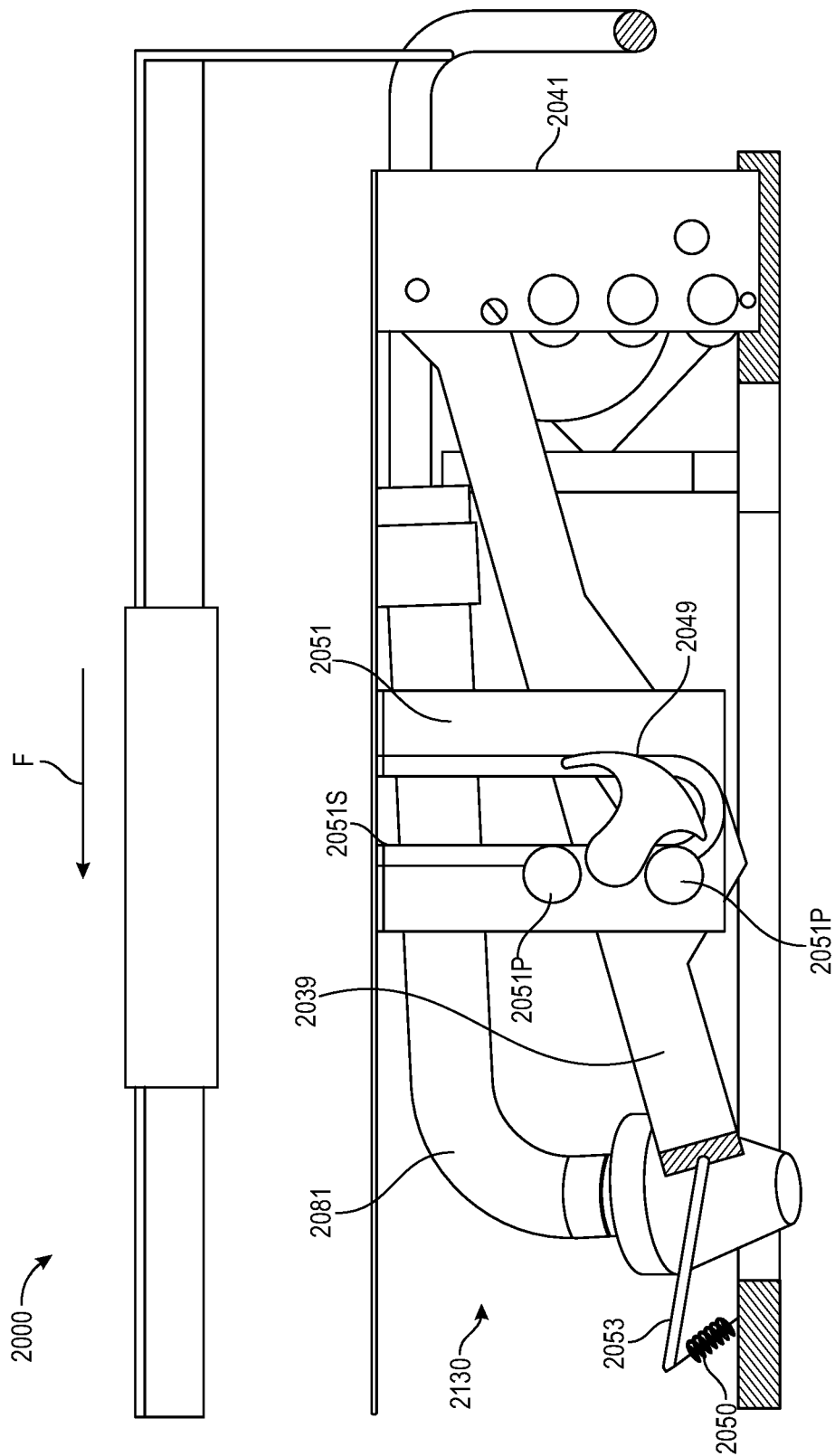
FIG. 23 is a sectional view show a dump position of the waste container of the commode of FIG. 10, which may be contrasted with the rest position of FIG. 18.

FIG. 17, and especially FIGS. 18 and 23, show how the container dumping arm 2039 and the associated mechanism, e.g., dumping system 2130, are configured to dump the waste container 2047. While FIG. 17 shows a top view with the waste container attached, FIG. 18 and FIG. 23 provide outward-looking elevation views illustrating the dumping system 2130 during two of the stages of the dumping process, shown without the container 2047. As mentioned above, the container dumping arm 2039 is rotatably mounted to the housing mechanical wall 2041 in two places at the rear of commode 2000. As the dumping arm 2039 is rotated down by the spring 2050, arm 2039 pull both tumblers 2049, forcing them down the vertically-directed slots 2051S in columns 2051. As the tumblers 2049 travel further downward, they rotate around the upper or first post 2051P on the adjacent dumbing columns 2051 due to engagement with one of the curved recesses 2049R, causing tumblers 2049 to tumble or rotate approximately 75 to 90 degrees and then catch the lower or second post 2051P in the other curved recess 2049R, completing the downward travel. Consequently, tumblers 2049 tumble a second time, another approximately 75 to 90 degrees. Thus, in the process, the tumblers 2049 and the attached waste container 2047 rotate approximately 150 to 180 degrees; although, some embodiments include more or less rotation, within a practical limit of motion. The compound motion of tumblers 2049, e.g., the downward translation followed by sequential rotations, cause tumblers 2049 and the attached waste container 2047 first to traverse downward and subsequently to rotate backwards and turn upside-down, as shown in FIG. 20, allowing the waste that may be contained therein to be dumped from the rear of container 2047 into the other toilet bowl, which is supporting commode 2000. In this manner, the combined or compound movement of dumping arm 2039 and tumblers 2049 configure and drive waste container to move between an upright, rest position and an inverted or upside-down dump position, bi-directionally. FIG. 20 shows the dump position of waste container 2047 and dumping arm 2039.

Referring to FIG. 17 and FIG. 20, when waste container 2047 inverts or dumps, as described, it actuates the flushing trough 2045 to rotate down and causes trough 2045 and nozzle 2043 to be positioned under waste container 2047. Nozzle 2043 being attached to the trough 2045 is directed towards the interior of the inverted waste container 2047. At this same time, as mentioned above, the flushing process begins so that nozzle 2043 discharges cleaning water onto the interior surface of the inverted waste container 2047, and the sprayed water along with any waste drops directly into the toilet bowl below it. Subsequently, the operator can simply flush the waste using the flushing feature of the receiving toilet bowl.

When the dumping and flushing process in completed, waste container 2047 may be returned to its upright, rest position by upward movement of the dumping arm 2039, moving from the arrangement of FIG. 23 to the arrangement FIG. 18 and FIG. 10, as an example. Pedal stand 2090 and foot pedal 2093 are also raised to their rest positions. This return-to-rest process, and perhaps other processes, is facilitated in some embodiments, by color indicators (not shown) that travel on the cables or the gears to indicate to the user when to take certain actions. For example, when the dumping and flushing process in completed, the pedal stand 2090 is held above the system lock 2097 until the appropriate indicator indicates that the system lock 2097 can be moved. Then the pedal stand 2090 may be returned to its rest position and locked by the system lock 2097. The indicator will indicate that this return-to-rest position action is to take place before all the water is vacated from the pump cylinder 2016. This portion of water is retained to later be deposited in the waste container 2047 in preparation for receiving additional human waste. Referring to FIG. 16, this process is accomplished by the pedal stand 2090 when it is put into its rest position and presses on seesaw 2005. As a result, the seesaw 2005 raises the container dumping arm 2039 and thus the waste container 2047 to its waste receiving condition, its rest position. Referring again to FIG. 10, the return movement of waste container 2047 causes trough 2045 to pivot back to its rest position. This happens before all the water is evacuated from the pump cylinder 2016 by the bungee 2017. Subsequently, pump 14 provides additional water to the jet nozzle 2043, and the water flows across the trough 2045 into waste container 2047 so a pool of cleaning water is in the container 2047 in preparation for human waste to be deposited again, to keep the waste loose and thereby assist in cleaning. In place of the mechanical indicators on a cable or pulley, which were discussed above, some embodiments, such as embodiments having electrical devices, may include electrical indicators in place of or in addition to mechanical indicators, to indicate or to cause changes between stages of the dumping and flushing process.

Description of a Third Embodiment

Figure 24:
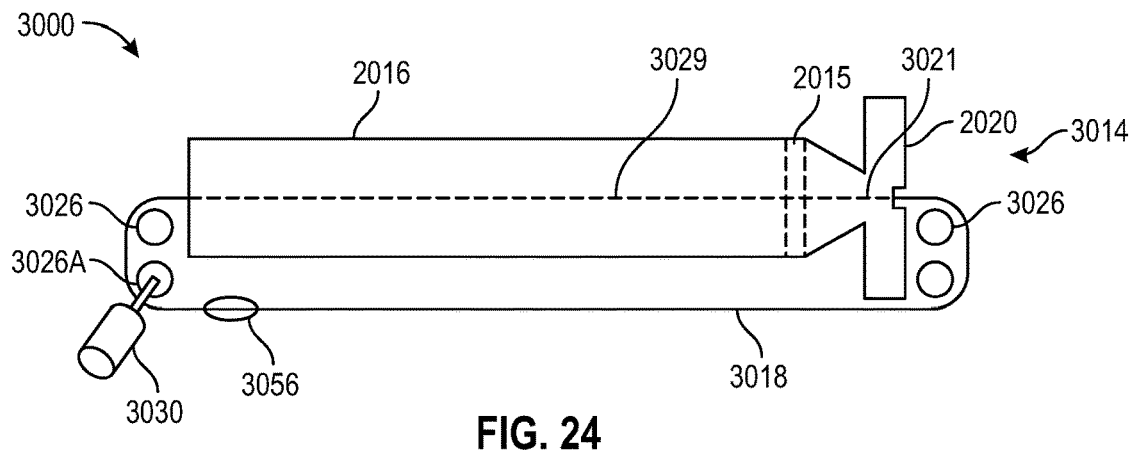
FIG. 24 is a diagram of an embodiment of a motor operated flushable portable commode that includes a piston-cylinder pump driven by the motor in accordance with principles described herein.

FIG. 24 presents an embodiment of a motor-operated flushable portable commode 3000 in which a motor-driven pump 3014, as shown schematically, replaces the pump 2014 in commode 2000, coupling to what has already been described with respect to FIG. 10 and the related figures. Pump 3014 is a cable-driven piston-cylinder assembly. Comparing these embodiments, commode 3000 operates without a primary gear 2007 and secondary gear 2009, pedal 2093, stand 2090 and most of the associated foot pedal and bungee mechanism that drives pump 2014. The pump 3014 includes a complete loop 3018 coupled to both sides of a pump piston 2015, which is slidingly disposed in a cylinder 2016, and includes an union box 2020 at its front end. Union box 2020 functions as an end cap coupled for fluid communication with an intake fluid path and a discharge fluid path (Refer to intake tubes 2081, 2035 and exhaust tube 2037 of FIG. 16 for examples). In this embodiment, the complete loop 3018 is a combination of a cable and chain. The complete loop 3018 is suspended on a plurality of rotating elements 3026 and includes a first cable portion 3021 coupled to the front of the piston 2015 and a second cable portion 3029 coupled to the backside of piston 2015 and extending through a seal in union box 2020. The current embodiment includes four rotating elements, and the four rotating elements include a gear 3026A that is coupled to an electric motor 3030 and coupled to the complete loop 3018 to move loop 3018 and therefore piston 2015. Thus, complete loop 3018 and its first and second cable portions 3021, 3029 are coupled a drive element (e.g., rotating element 3026A or motor 3030) capable of causing the loop and the cable portions and piston 2015 to move.

Motor 3030 is the prime mover for the cable-driven piston-cylinder pump 3014 and for other systems of commode 3000. The first cable portion 3021 may also be described an exhaust cable or an exhaust string because sufficient tension in first cable portion 3021 may be used to remove fluid from pump 3014 through union box 2020. The second cable portion 3029 may also be called intake cable or an intake piston string because sufficient tension in second cable portion 3029 may be used to draw fluid into pump 3014 through union box 2020. In this embodiment, pump 3014 lacks a piston shaft coupled to piston 2015, unlike conventional piston-cylinder pumps that include a piston shaft attached to a piston to move the piston.

Figure 25:
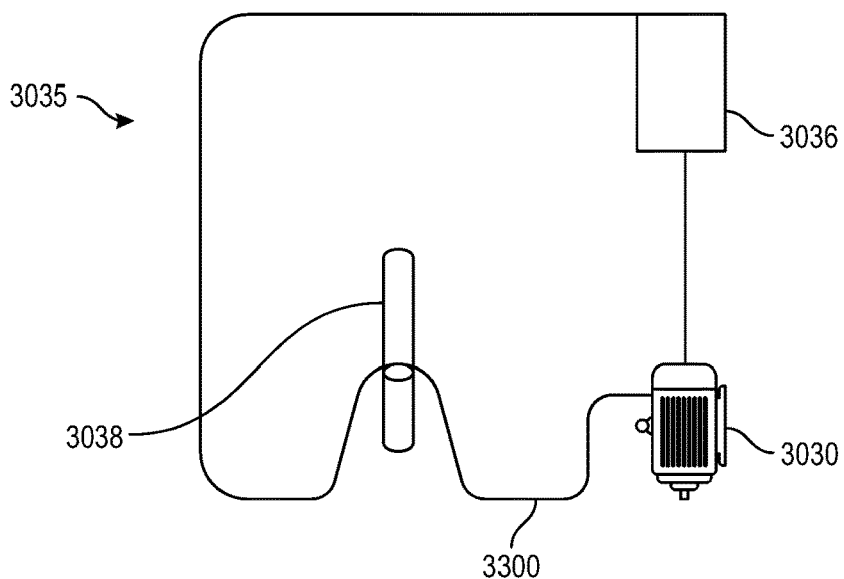
FIG. 25 is a diagram of and electric circuit for the portable commode of FIG. 24, in accordance with principles described herein.

FIG. 25 presents an associated electric system or circuit 3035, which includes a rechargeable electric battery 3036 and the motor 3030, indicating a few the conventional electric components involved in electric circuit 3035. Electric circuit 3035 also includes a control handle 3038. Alternatively, battery 3036 may be replaced by another electrical power source such as an electrical plug power source, e.g., alternating current.

Figure 26:
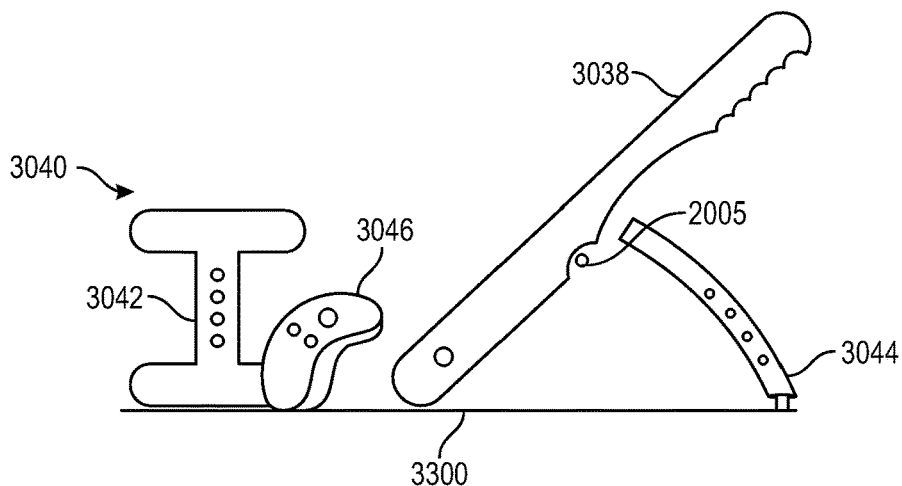
FIG. 26 is a diagram of a mechanical control console for the portable commode of FIG. 24, including a control handle, in accordance with principles described herein.

FIG. 26 describes a mechanical control console 3040 that includes mechanical levers and actuators associated with the electrical system 3035 of FIG. 25. This control console 3040 replaces the foot pedal 2093 and manual hand operation section of commode 2000. Control console 3040 includes an electrical grid 3300 (FIGS. 25 and 28) adjacent (e.g., above) which are coupled the control handle 3038, an intake contact lever 3042, an exhaust contact lever 3044, and a refill lever 3046. The electrical grid 3300 corresponds a plurality of electrical contacts, which may be in electrical switches, as an example.

Figure 27:
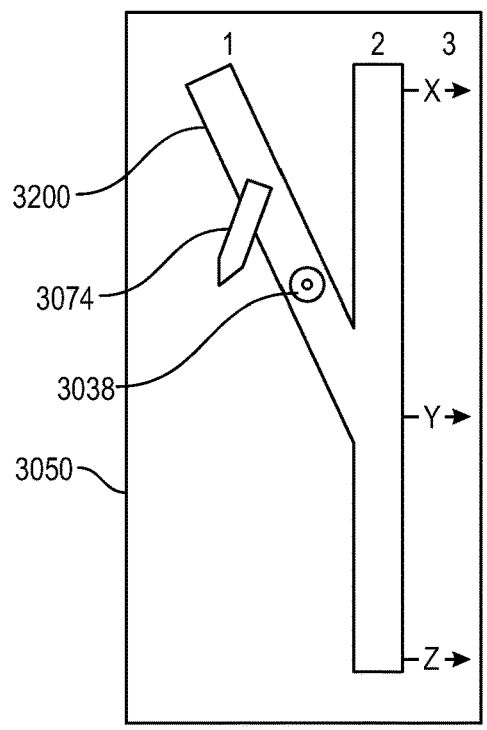
FIG. 27 is a diagram of a cover or guide plate for the mechanical control console of FIG. 26 in accordance with principles described herein, the cover having a console template pattern cut through it to guide a control handle.

FIG. 27 show a console diagram or console template pattern 3200 formed through a guide plate or cover 3050 that lays above and adjacent the pump cylinder 2016 (FIG. 24). The cover 3050 is disposed over the mechanisms in FIG. 26, for control console 3040. The control handle 3038 protrudes vertically through the console template 3200 on cover 3050 and the movement of handle 3038 is governed or constrained by console template 3200.

Figure 28:
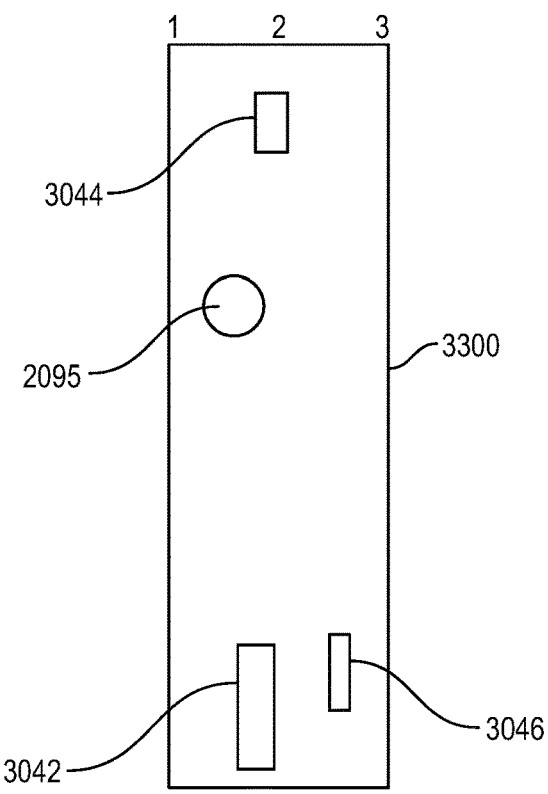
FIG. 28 is a diagram of an electrical grid for controlling the portable commode of FIG. 24, in accordance with principles described herein.

FIG. 28 shows the electrical grid 3300 along which, the control lever 3042, 3044, 3046 and associated actuators make electrical contact to operate the movement of the piston 2015, the pumping of cleaning water, and the movement of waste container 2047 in a prescribed sequence, (along with other mechanism already manifested) to enable a synchronized operation of commode 3000 to dump and flush waste container 2047. The prescribed sequence may operate according to any of the compatible flushing and dumping operations described herein.

FIGS. 29, 30, 31, and 32 show various side views of the piston 2015 of pump 3014 connected to its cable and chain loop 3018 with a torpedo actuator 3056 thereto. For the convenience of viewing, the cylinder 2016 is not shown in these views. These figures help explain how the control levers and actuators of control console 3040 operate to control the electric motor 3030 to ultimately move the piston 2015 and cause a flow of the cleaning water. In addition to the grid 3300, a plurality of switches, including switches 3061, 3062, 3063, are members of the electric system 3035 (FIG. 25). The switches 3061, 3062, 3063 are disposed along the path of torpedo actuator 3056 and loop 3018 outside pump cylinder 2016 (FIG. 24). In these figures, the switches 3061, 3062, 3063 have broken lines connected to a pivot point 3066, which represents functional components of the switches. These broken lines indicate an electrical connection from the electrical grid 3300 to the electrical contacts of the pivot point, and the solid line extending from the pivot point indicates a mobile part, e.g., an arm, of the switch which may be pushed by the torpedo actuator 3056 as it moves linearly along with cable loop 3018.

Figure 29:
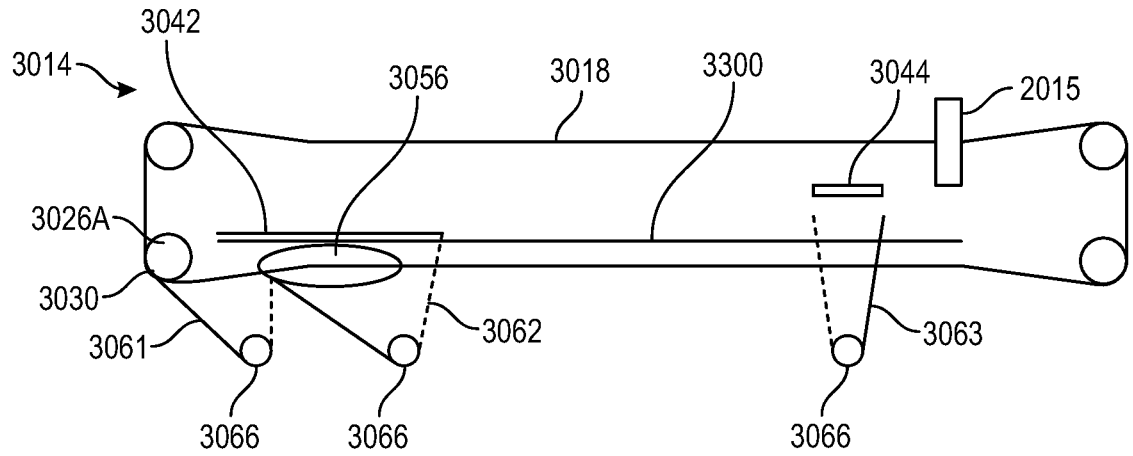
FIG. 29, FIG. 30, FIG. 31, and FIG. 32 show various diagrams with side views of the piston and cable system of the pump of FIG. 24.

Referring to FIG. 29, in the current embodiment, the motor 3030 is coupled to rotate a gear positioned to coincide with a chain that is connected to the section between the back side of piston 2015 (its left side as drawn) to a gear just below the motor gear 3026A.

Referring again to FIG. 11 and FIG. 12, during the operation of the flushable portable commode 3000, which has a similar housing structure to commode 2000, an operator may hold the unit in her right hand by grasping handle 2099 as described with respect to the foot pedal operated commode 2000. Standing before a toilet bowl that can receive waste from commode 3000, the operator may use a her left hand to rotate the intake control handle 2059 which lowers the intake tube 2081 which locks as explained above. The operator steers the intake tube into the toilet bowl trap, as before, while simultaneously placing the unit on top of the toilet bowl. Now unit is ready to siphon water out of the bowl and into the pump cylinder 2016.

Referring to FIGS. 26 and 27, the control handle 3038, which extends through console template 3200 of cover 3050 may be operated in accordance with the pattern of console template 3200. In this example, template pattern 3200 is a physical pattern that guides or constrains the movement of control handle 3038. At its rest position, the control handle 3038 of FIG. 26 is located at position 1-*x* of the console template 3200. This rest position is also represent by FIG. 29 in which the intake contact lever 3042 is positioned over electrical contacts 3061, 3062. The contacts 3061, 3062 may be referred to as a rest switch and refill switch, respectively. The disconnected relationship between lever 3042 and contacts 3061, 3062 indicates that the electrical system 3035 is not active. Also notice a torpedo actuator 3056 on the cable 3018 is also deactivating the both of these spring loaded switches 3061, 3062. Hence, electricity cannot flow through the circuit to operate the electric motor in the rest condition depicted by FIG. 29.

Figure 30:
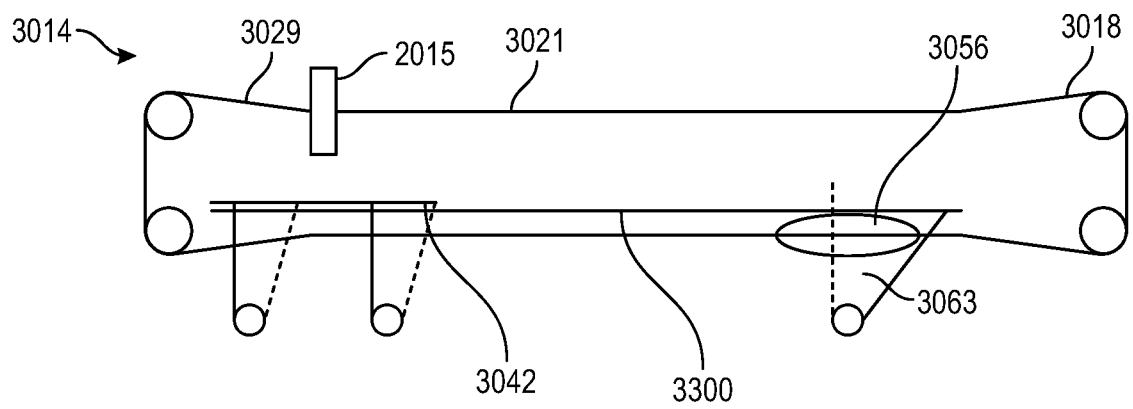

To begin a flushing and dumping operation, the operator would place her on the control handle 3038 while the control handle 3038 is located at position 1-x of FIG. 27. The operator first moves the control handle 3038 from position 1-x to position 2-z. As shown in FIG. 30, position 2-z causes contact to be made between the intake contact lever 3042 over the torpedo deactivated switches (1000 and 2000) causing electrical flow to bypass deactivated switches 1000 and 2000 causing the circuit to flow electrically and therefore the motor turns the cable/chain (I). The motor is now driving the cable. The torpedo actuator 3056 moves linearly, releasing the two switches 3061, 3062 to return to a contact position. The torpedo actuator 3056 continues to move until it pushes the spring loaded contact point or switch 3063 shutting-off the circuit 3035 after having moved the piston to the end of its intake stroke (far left position in FIG. 30).

Figure 31:
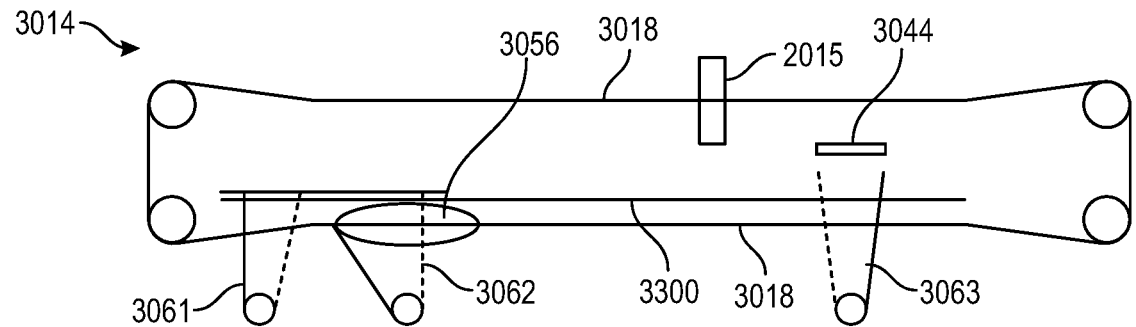

Continuing to reference FIG. 27, Then the operator pushes the control handle 3038 forward from intake position 2-z to exhaust position 2-x on console template 3200. Moving the handle forward to position 2-x actuates a polarity switch, causing the motor to rotate in the opposite direction, and causes electric current contact by the control handle 3038 pushing the exhaust contact lever 3044 onto switch 3063. As represented in FIG. 31, this condition executes the exhaust stroke of the piston 2015 (moving left to right). Also, when the control handle 3038 is moved from the intake position 2-z to the exhaust position 2-x, the control handle 3038 switches the intake/container bypass coordinator 2095 (See also FIG. 19 and discussion of operating pedal-driven commode 2000.), thus causing the waste container 300 to dump into the supporting toilet bowl as the intake tube 2081 retracts from the toilet trap water, back into the housing (FIG. 20). Hence, with the waste container in an inverted position over the nozzle 43 (FIG. 10) and the forceful discharging of the cleaning water from the cylinder 2016 by the electric motor 3030 driving the piston 2015, the flushing of the waste container 2047 is accomplished. But, as indicated in FIG. 31, as the torpedo actuator 3056 is being driven to the right during the exhaust stroke, which flushes the waste container, actuator 3056 trips switch 3062 and stops the exhausting of the water from the cylinder 2016 before all of the water is removed. The waste container is still inverted at this point in the process.

Figure 32:
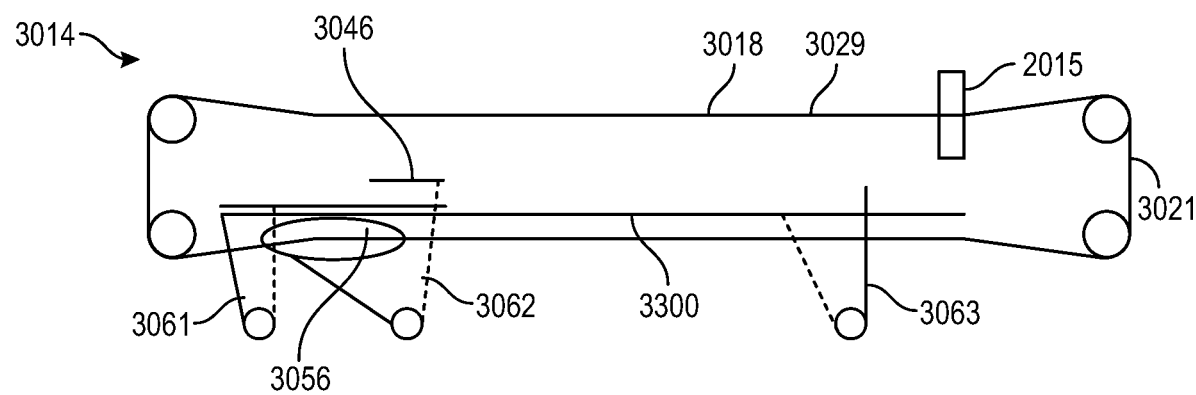

Next, the operator moves the control handle 3038 from the flushing position 2-x to the rest position 1-x. The control handle 3038 goes on a crossing angle. A horizontal axle with a ball on it matching an area at the pivot point on the handle will provide linear, lateral and angular movement. As the control handle 3038 is moved to position 1-x, it activates two mechanisms: First, control handle 3038 it pushes down the seesaw 2005 (shown in FIG. 17 and FIG. 15) that raises the container dumping arm 2039 (as discussed above), thus raising the waste container 2047 to its upright, receiving, and rest position. And secondly, referring to FIG. 26, control handle 3038 depresses the refill lever 3046 that makes electric current to flow past the deactivated switch 3062, deactivated by the torpedo actuator 3056 (Diagram 8 includes this event). Activating the motor 3030 again drives the piston 2015 to exhaust the remaining water out of the pump cylinder 2016 while the while the container is in an upright waste-receiving position, leaving fresh water deposited in the waste container to keep future incoming waste loose. As shown in FIG. 32 the torpedo actuator 3056 eventually disengages switch 3062 and thus shuts the electric off until unit need to be flushed again. Referring again to FIG. 27, in at least some instances, it is preferable that the control handle 3038 be put into a lock position behind a suitable catch 3074 that interfaces within the console track towards the position 1-x.

Figure 33:
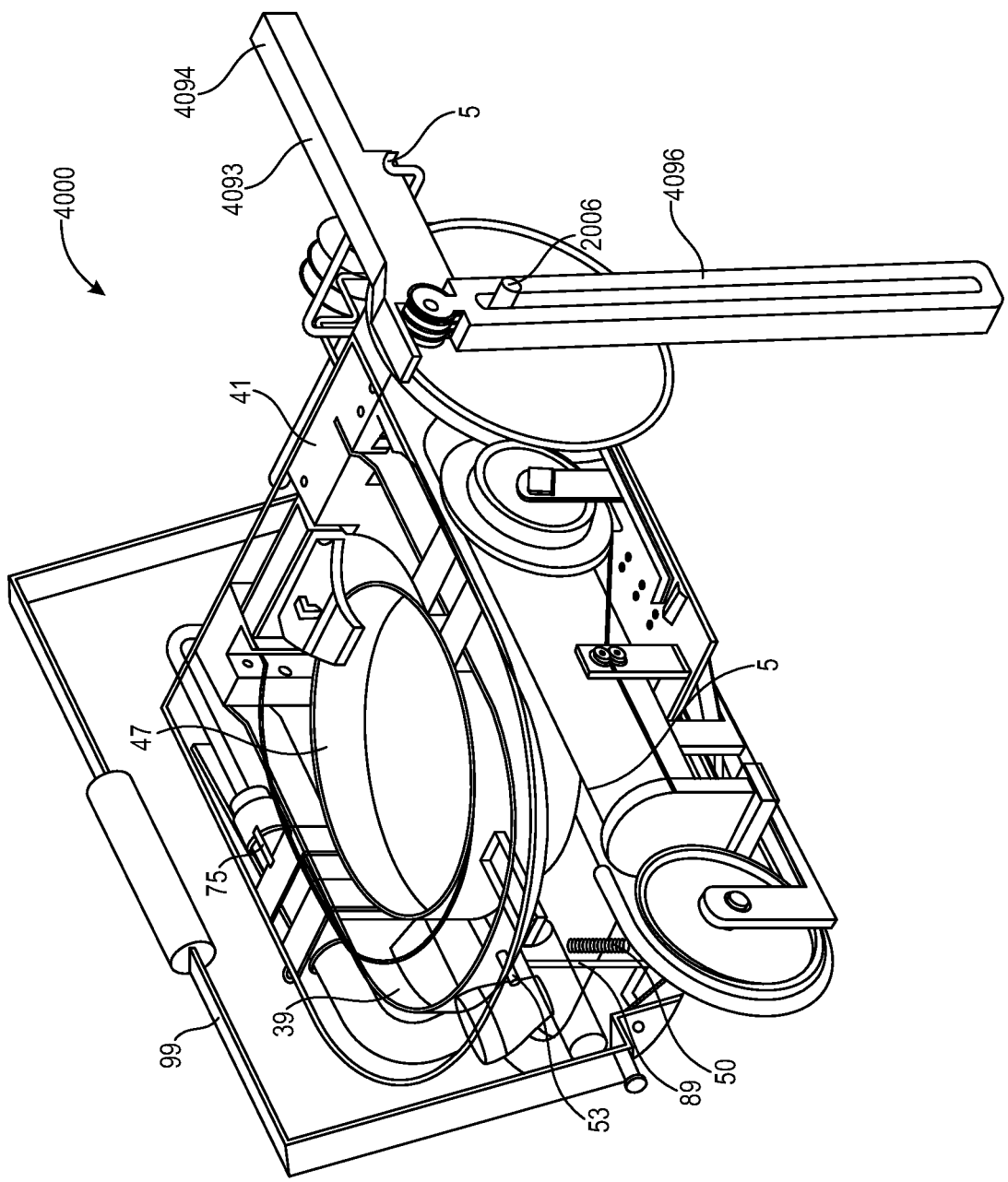
FIG. 33 is a right-front isometric view of an embodiment of a lever operated flushable portable commode in accordance with principles described herein.
Figure 34:
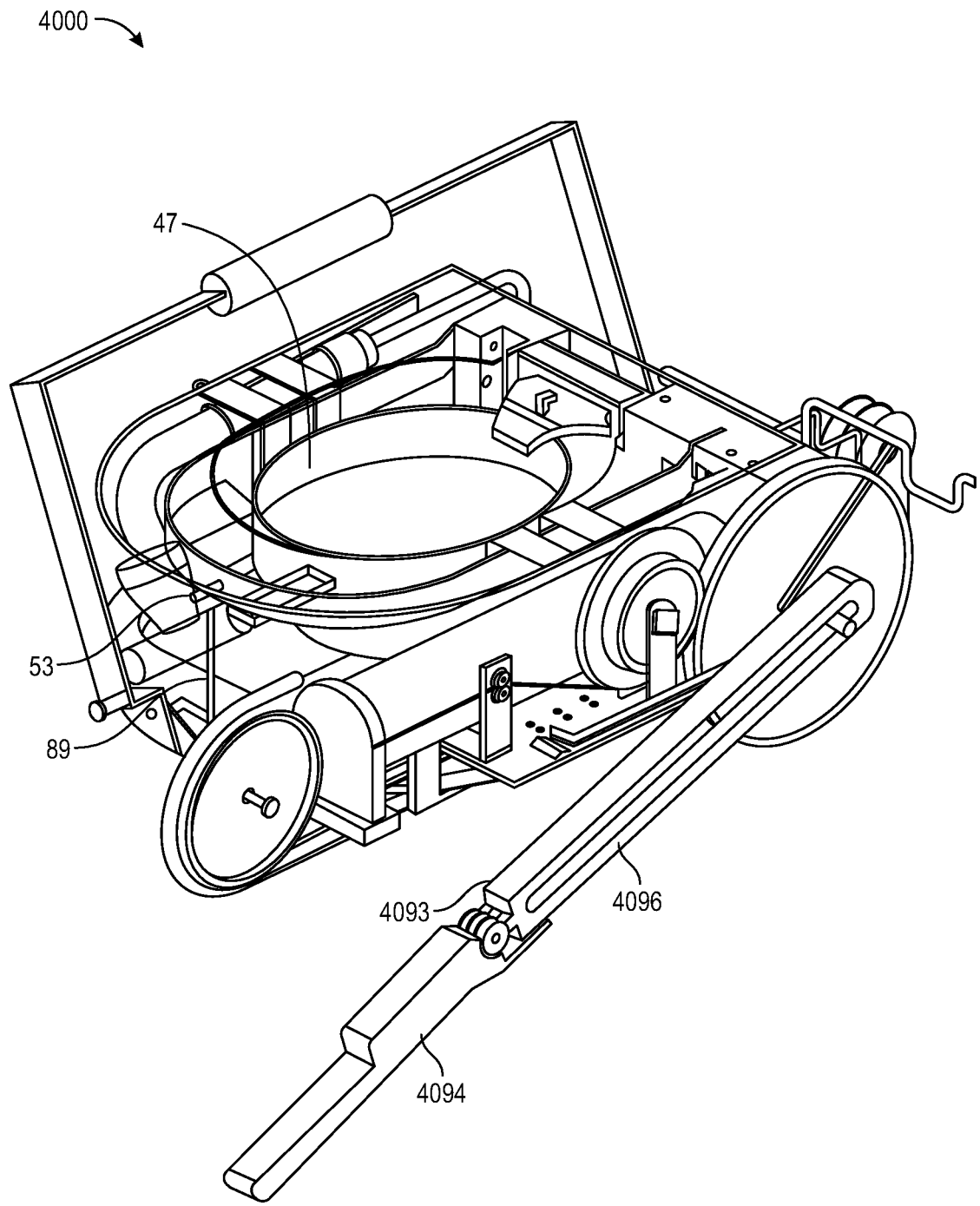
FIG. 34 is another right-front isometric view of the portable commode of FIG. 33.
Figure 35:
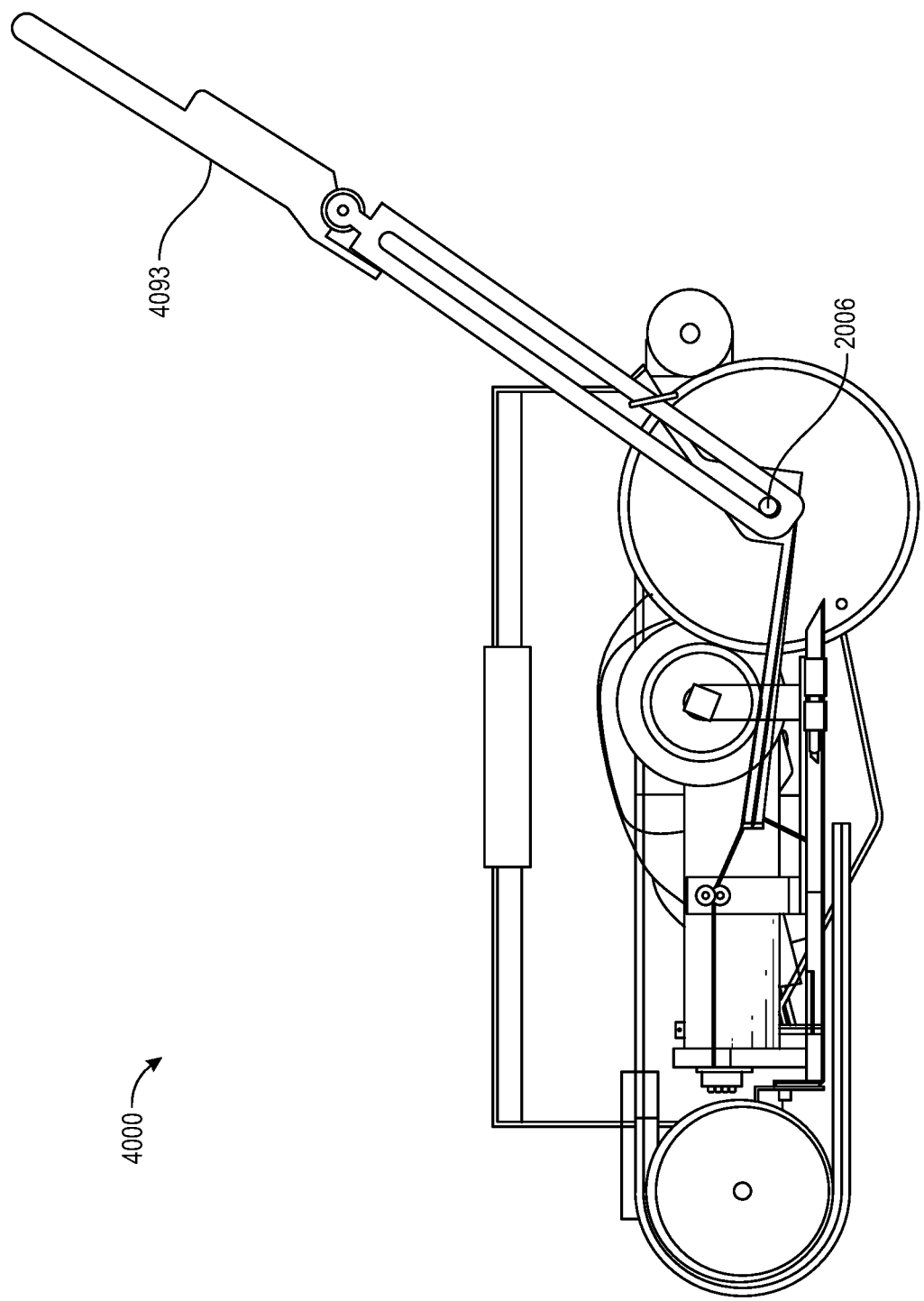
FIG. 35 is right side view of the portable commode of FIG. 33.

FIGS. 33, 34, and 35 show an embodiment of a lever operated flushable portable commode 4000, which has the configuration of commode 2000 (e.g., FIG. 10) with a few modifications. Modifications include the addition of a hand-operable lever 4093 that replaces foot pedal 2093. Lever 4093 includes a handle portion 4094 pivotally mounted to and extending from a slotted portion 4096. Slotted portion 4096 is slidingly and rotatably coupled to axle 2006, which extends into or through a slot in Slotted portion 4096. Other modifications as well as the characteristics of lever 4093 and pedal stand 4090 may be observed from the referenced figures. The functionality and operation of commode 4000 may be understood from the description of commode 2000 with consideration given to the disclosed modifications of commode 4000.

Additional Details about Various Embodiments

As presented above, this disclosure provides multiple embodiments of flushable portable commodes configured to perform a group of operations when initiated by a user controllable actuator. Examples of commodes having this capability include commodes 1, 2000, 3000, 4000. Each of these commodes includes a user controllable actuator, such as the start switch 90 (FIG. 3), the assembly of pedal stand 2090 and foot pedal 2093 (FIG. 10), the control handle 3038 (FIG. 26), or the hand-operable lever 4093 (FIG. 33), respectively. Listed here in an arbitrary sequence, the group of operations includes (1) accomplishing a first rotation of the tubing support member, (2) accomplishing a second rotation of the tubing support member, (3) operation of the pump to receive fluid, (4) operation of the pump to discharge the fluid, (5) movement of the waste container from the rest position to the dump position, and (6) movement of the waste container from the dump position to the rest position. In various embodiments, the group of operations includes more operations in accordance with the disclosure herein or may include fewer operations. In some embodiments, the group of operations (i.e. the members of the group) are synchronized to occur in a prescribed sequence, and may follow that sequence with operator oversight or may follow that sequence automatically, e.g., governed by electronic system 44 (FIG. 2), as an example. The prescribed sequence may operate according to any compatible flushing and dumping activity described herein, including portions of such activity.

The invention claimed is:
1. A flushable portable commode, comprising:
a support structure configured to be placed on a commode;
a waste container pivotably coupled to the support structure and rotatable between a rest position and a dump position;

a tubing support member rotatably coupled to the support structure and operable to lower and raise an intake tube into and out of the commode;

a pump in fluid communication with the intake tube and including a switch actuator engageable with first and second switches as the pump operates;

a motor that drives the pump;

an electronic system in communication with the motor and the first and second switches, wherein the electronic system actuates the motor to operate the pump in a first direction until the switch actuator engages the first switch and thereby draws in a fluid from the commode via the intake tube, and wherein the electronic system actuates the motor to operate the pump in a second direction until the switch actuator engages the second switch and thereby discharges a portion of the fluid into the waste container when the waste container is in the dump position.

2. The flushable portable commode of claim 1, wherein the intake tube is wound about the tubing support structure.

3. The flushable portable commode of claim 1, further comprising a dumping arm coupled to the support structure at a first rotational coupling, wherein the waste container is coupled to the dumping arm at a second rotational coupling, and wherein the first and second rotational couplings configure the waste container to move between the rest position and the dump position by translating and rotating.

4. The flushable portable commode of claim 1, further comprising an exhaust tube in fluid communication with the pump and extending to the waste container to discharge the portion of the fluid into the waste container when the waste container is in the dump position.

5. The flushable portable commode of claim 4, wherein the exhaust tube becomes exposed upon rotating the waste container to the dump position.

6. The flushable portable commode of claim 1, wherein the pump further includes a piston that reciprocates within a piston cylinder, and the switch actuator moves to engage the first and second switches as the piston moves within the piston cylinder, and wherein operating the pump in the first direction causes the piston to move in the first direction until the switch actuator engages the first switch, and operating the pump in the second direction causes the piston to move in the second direction until the switch actuator engages the second switch.

7. The flushable portable commode of claim 6, wherein the portion of the fluid is a first portion and the switch actuator is further engageable with a third switch as the piston moves within the piston cylinder, the third switch being in communication with the electronic system, and wherein the electronic system actuates the motor to move the piston in the second direction until the switch actuator engages the third switch and thereby discharges a second portion of the fluid into the waste container when the waste container is returned to the rest position.

8. The flushable portable commode of claim 1, wherein the motor further drives rotation of the waste container to move the waste container between the rest and dump positions, and rotation of the tubing support member to lower and raise the intake tube support member.

9. The flushable portable commode of claim 8, further comprising a user controllable actuator in communication with the electronic system and manually actuatable by a user to undertake one or more operations including:

rotating the waste container between the rest and dump positions;

rotating the tubing support member to lower the intake tube;

rotating the tubing support member to raise the intake tube;

operating the pump to draw in the fluid from the commode via the intake tube; and operating the pump to discharge the portion of the fluid into the waste container.

10. The flushable portable commode of claim 8, wherein the motor is operatively coupled to a clutch selectively actuatable to operate the pump, rotate the waste container, and rotate the tubing support member.

11. A method of operating a motor-driven compression flushable portable commode, comprising:

locating the portable commode atop a fixed toilet bowl, the portable commode including:
a support structure matable with the fixed toilet bowl;
a tubing support member rotatably coupled to the support structure;
a pump that includes a switch actuator engageable with first and second switches as the pump operates;
a motor that drives the pump; and
an electronic system in communication with the motor and the first and second switches;

rotating the tubing support member and thereby lowering an intake tube into the fixed toilet bowl;

actuating the motor with the electronic system to operate the pump in a first direction until the switch actuator engages the first switch and thereby drawing in a fluid from the fixed toilet bowl via the intake tube;

rotating the tubing support member and thereby raising the intake tube;

rotating a waste container pivotably coupled to the support structure from a rest position to a dump position and thereby discharging waste within the waste container into the fixed toilet bowl;

actuating the motor with the electronic system to operate the pump in a second direction until the switch actuator engages the second switch and thereby discharging a portion of the fluid into the waste container while the waste container is in the dump position; and rotating the waste container back to the rest position.

12. The method of claim 11, further comprising:

exposing an exhaust tube in fluid communication with the pump when the waste container is rotated to the dump position; and discharging the portion of the fluid into the waste container via the exhaust tube.

13. The method of claim 11, wherein the motor is operatively coupled to a clutch selectively actuatable to operate the pump, rotate the waste container, and rotate the tubing support member.

14. The method of claim 11, further comprising:

engaging the motor to rotate the tubing support member; and engaging the motor to rotate the waste container between the rest and dump positions.

15. The method of claim 14, further comprising manually actuating a user controllable actuator in communication with the electronic system and thereby undertaking one or more operations including:

rotating the waste container between the rest and dump positions;

rotating the tubing support member to lower the intake tube;

rotating the tubing support member to raise the intake tube;

operating the pump to draw in the fluid from the commode via the intake tube; and operating the pump to discharge the portion of the fluid into the waste container.

16. The method of claim 11, wherein the pump further includes a piston that reciprocates within a piston cylinder, and the switch actuator moves to engage the first and second switches as the piston moves within the piston cylinder, the method further comprising:

moving the piston in the first direction until the switch actuator engages the first switch as the pump operates in the first direction; and moving the piston in the second direction until the switch actuator engages the second switch as the pump operates in the second direction.

17. The method of claim 16, wherein the portion of the fluid is a first portion and the switch actuator is further engageable with a third switch as the piston moves within the piston cylinder, the third switch being in communication with the electronic system, the method further comprising:

actuating the motor with the electronic system to move the piston in the second direction until the switch actuator engages the third switch and thereby discharging a second portion of the fluid into the waste container when the waste container is in the rest position.

* * * * *